(12) United States Patent
Webster et al.

(10) Patent No.: US 7,799,434 B2
(45) Date of Patent: Sep. 21, 2010

(54) FUNCTIONALIZED POLYSILOXANE POLYMERS

(75) Inventors: Dean C. Webster, Fargo, ND (US); Abdullah Ekin, Imperial, PA (US)

(73) Assignee: NDSU Research Foundation, Fargo, ND (US)

( * ) Notice: Subject to any disclaimer, the term of this patent is extended or adjusted under 35 U.S.C. 154(b) by 105 days.

(21) Appl. No.: 11/989,496

(22) PCT Filed: Jul. 26, 2006

(86) PCT No.: PCT/US2006/029035

§ 371 (c)(1), (2), (4) Date: Jan. 25, 2008

(87) PCT Pub. No.: WO2008/008077

PCT Pub. Date: Jan. 17, 2008

(65) Prior Publication Data

US 2009/0111937 A1   Apr. 30, 2009

Related U.S. Application Data

(60) Provisional application No. 60/703,532, filed on Jul. 29, 2005.

(51) Int. Cl.
B32B 9/04    (2006.01)
C08G 77/448  (2006.01)

(52) U.S. Cl. .................. 428/447; 528/25; 528/26; 528/28; 528/38; 528/44; 528/76; 528/80; 528/85

(58) Field of Classification Search ............. None
See application file for complete search history.

(56) References Cited

U.S. PATENT DOCUMENTS

| | | | |
|---|---|---|---|
| 4,125,491 A | 11/1978 | Gorman | |
| 4,298,543 A | 11/1981 | Law et al. | |
| 4,687,813 A | 8/1987 | Lenz et al. | |
| 4,697,913 A | 10/1987 | Kuramoto et al. | |
| 4,902,767 A | 2/1990 | Roitman et al. | |
| 4,910,252 A | 3/1990 | Yonehara et al. | |
| 4,933,178 A | 6/1990 | Capelli | |
| 5,001,210 A | * 3/1991 | Coury et al. ................. 528/85 |
| 5,019,096 A | 5/1991 | Fox, Jr. et al. | |
| 5,203,991 A | 4/1993 | Kutsuna et al. | |
| 5,237,082 A | 8/1993 | Leir et al. | |
| 5,641,855 A | 6/1997 | Scherr et al. | |
| 5,986,018 A | 11/1999 | Yamaguchi et al. | |
| 6,030,632 A | 2/2000 | Sawan et al. | |
| 6,099,897 A | 8/2000 | Sayo et al. | |
| 6,153,724 A | 11/2000 | Hollingsworth | |
| 6,224,579 B1 | 5/2001 | Modak et al. | |
| 6,413,446 B1 | 7/2002 | Mechtel et al. | |
| 6,458,878 B1 | 10/2002 | Tsuboi et al. | |
| 6,482,912 B2 | 11/2002 | Boudjouk et al. | |
| 6,500,549 B1 | 12/2002 | Deppisch et al. | |
| 6,524,564 B1 | 2/2003 | Kim et al. | |
| 6,559,201 B2 | 5/2003 | Simendinger, III | |
| 6,716,895 B1 | 4/2004 | Terry | |
| 6,861,493 B2 | 3/2005 | Bauer et al. | |
| 6,949,598 B2 | 9/2005 | Terry | |
| 7,098,256 B2 | 8/2006 | Ong et al. | |
| 7,141,183 B2 | 11/2006 | Hattori et al. | |
| 7,179,789 B2 | 2/2007 | Patt | |
| 7,204,940 B2 | 4/2007 | McDonald et al. | |
| 7,345,131 B2 | 3/2008 | Selbertinger et al. | |
| 7,378,156 B2 | 5/2008 | Terry | |
| 7,449,537 B2 | 11/2008 | Boudjouk et al. | |
| 7,452,956 B2 | 11/2008 | Cheng et al. | |
| 7,544,722 B2 | 6/2009 | Boudjouk et al. | |
| 2002/0013385 A1 | 1/2002 | Simendinger, III | |
| 2002/0098214 A1 | 7/2002 | Adams et al. | |

(Continued)

FOREIGN PATENT DOCUMENTS

CA    2 413 672 A1    8/2003

(Continued)

OTHER PUBLICATIONS

Ekin, Abdullah et al., "Synthesis and Characterization of Novel Hydroxylalkyl Carbamate and Dihydroxyalkyl Carbamate Terminated Poly (dimethylsiloxane) Oligomers and Their Block Copolymers with Poly (ε-caprolactone), Macromolecules", 2006, 39, pp. 8659-8668, Dec. 12, 2006.

(Continued)

Primary Examiner—Marc S Zimmer
(74) Attorney, Agent, or Firm—Foley & Lardner LLP

(57) ABSTRACT

Polysiloxanes terminated with one or more hydroxy functional carbamate groups are provided. The polymers may have the formula (I) wherein $R^1$, $R^2$, $R^3$, and $R^4$ are independently hydrogen, $C_1$-$C_{10}$ alkyl, $C_1$-$C_{10}$ fluoro-substituted alkyl; cyclopentyl, cyclohexyl, benzyl, toluoyl, xylyl and/or phenyl; $R^5$ and $R^6$ are linking groups; $R^{15}$ and $R^{16}$ are independently hydrogen, $C_1$-$C_{10}$ alkyl, cyclopentyl, cyclohexyl, benzyl, toluoyl, xylyl or phenyl; and $L^1$ and $L^2$ are linking groups. Typically, x is such that the polymer has a molecular weight of about 1,000 to 100,000. Other polymeric materials produced by reacting with an isocyanate functional compound or a lactone and coating compositions containing such polymeric materials are also provided.

(I)

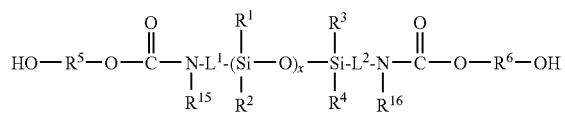

23 Claims, 6 Drawing Sheets

U.S. PATENT DOCUMENTS

| | | | |
|---|---|---|---|
| 2002/0156223 | A1 | 10/2002 | Boudjouk et al. |
| 2003/0022793 | A1 | 1/2003 | Ring et al. |
| 2003/0044451 | A1 | 3/2003 | McGhee et al. |
| 2003/0129421 | A1 | 7/2003 | Terauchi et al. |
| 2003/0207962 | A1 | 11/2003 | Oya et al. |
| 2003/0236552 | A1 | 12/2003 | Roby |
| 2004/0116551 | A1 | 6/2004 | Terry |
| 2005/0009985 | A1 | 1/2005 | Selbertinger et al. |
| 2005/0080158 | A1 | 4/2005 | Ong et al. |
| 2005/0129962 | A1 | 6/2005 | Amidaiji et al. |
| 2005/0227092 | A1 | 10/2005 | Yamaya et al. |
| 2006/0014015 | A1 | 1/2006 | Travelute et al. |
| 2006/0276608 | A1 | 12/2006 | Lang et al. |
| 2007/0021529 | A1 | 1/2007 | Boudjouk et al. |
| 2007/0042199 | A1 | 2/2007 | Chisholm et al. |
| 2007/0048344 | A1 | 3/2007 | Yahiaoui et al. |
| 2007/0093618 | A1 | 4/2007 | Cheng et al. |
| 2007/0129474 | A1 | 6/2007 | Salamone et al. |
| 2007/0132949 | A1 | 6/2007 | Phelan |
| 2008/0112920 | A1 | 5/2008 | Chia et al. |
| 2008/0181862 | A1 | 7/2008 | Chisholm et al. |
| 2008/0199536 | A1 | 8/2008 | Terry |
| 2008/0213599 | A1 | 9/2008 | Webster et al. |
| 2009/0018276 | A1 | 1/2009 | Boudjouk et al. |
| 2009/0111937 | A1 | 4/2009 | Webster et al. |
| 2009/0143496 | A1 | 6/2009 | Ziche |
| 2009/0194733 | A1 | 8/2009 | Schulz et al. |
| 2009/0215762 | A1 | 8/2009 | Stafslien et al. |
| 2010/0004202 | A1 | 1/2010 | Chisholm et al. |

FOREIGN PATENT DOCUMENTS

| | | |
|---|---|---|
| CA | 2621000 | 3/2007 |
| EP | 1 496 079 A1 | 1/2005 |
| JP | 2-47371 A * | 2/1990 |
| WO | WO 2005/030405 A2 | 4/2005 |
| WO | WO 2006/086092 A2 | 8/2006 |
| WO | WO 2006/121937 A1 | 11/2006 |
| WO | WO 2007/053163 A2 | 4/2007 |
| WO | WO 2008/008077 A2 | 1/2008 |
| WO | WO 2009/025924 A2 | 2/2009 |

OTHER PUBLICATIONS

Yilgor, Iskender et al., "Novel triblock siloxane copolymer:Synthesis, characterization, and their use as surface modifying additives", Journal of Polymer Science Part A: Polymer chemistry, 1989, 27, 11, pp. 3673-3690.

Iojoiu, Cristina et al., "Modified poly (ε-caprolactone)s and their use for drug-encapsulating nanoparticles", Journal of Polymer Science Part A: Polymer chemistry, 2004, 42, 3, pp. 689-700.

Tang, Liping et al., "Anti-inflammatory properties of triblock siloxane copolymer-blended materials", Biomaterials, 1999, 20, pp. 1365-1370.

Karal, Oksan et al., "Blend of polycaprolactone-poly (dimethylsiloxane)-polycaprolactone triblock copolymer with poly-(vinyl chloride) preparation and characterization", Polymer, 1997, 38, 24, pp. 6071-6078.

Smetankina, N. P. et al., "Reactivity of organosilicon diisocyanates". XVII. Carcofunctional organosilicon compounds, Zhurnal Obshchei Khimii, 1974, 44(12), pp. 2638-2641.

International Search Report for International Application No. PCT/US2006/029035, mailed Dec. 24, 2007; 2 pages.

U.S. Appl. No. 12/378,155, filed Feb. 11, 2009, Chisholm et al.

U.S. Appl. No. 12/378,049, filed Feb. 10, 2009, Stafslien et al.

Ekin et al., "Library Synthesis and Characterization of 3-Aminopropyl-Terminated Poly(dimethylsiloxane)s and Poly(ε-caprolactone)-b-Poly(dimethylsiloxane)s," Journal of Polymer Science: Part A: Polymer Chemistry, 2006, vol. 44(16) (pp. 4880-4894).

Majumdar et al., "Preparation of Siloxane-Urethane Coatings Having Spontaneously Formed Stable Biphasic Microtopographical Surfaces," Macromolecules, 2005, vol. 38 (pp. 5857-5859).

English Abstract for Japanese Publication No. JP 63-277222 A, "Curing Resin", date of publication Nov. 15, 1988 (1 pg.).

U.S. Appl. No. 12/633,334, filed Dec. 7, 2009, Webster et al.

Abstract for JP 2003-327912, "Primer Antifouling Coating Material Composition for Ship, Composite Antifouling Coating Film for Ship, Method for Forming the Composite Antifouling Coating Film, Ship Coated with the Composite Antifouling Coating Film and Antifouling Method for Outer Hull of Ship", Masuda Hiroshi et al., publication date Nov. 19, 2003 (1 pg.).

Abstract for JP 4370163, "Coating Composition", Masuoka Shigeru et al., publication date Dec. 22, 1992 (1 pg.).

Abstract for JP 63-270738, "Polyamine/Polysiloxane Block Copolymer", Tezuka Yasushi et al., publication date Nov. 8, 1988 (1 pg.).

Abstract for JP 53-139653, "Marine Antifouling Material", Takamizawa Minoru et al., publication date Dec. 6, 1978 (1 pg.).

Adhikari et al., "Mixed Macrodiol-Based Siloxane Polyurethanes: Effect of the Comacrodiol Structure on Properties and Morphology.", Journal of Applied Polymer Science, vol. 78, 2000 (pp. 1071-1082).

Bullock et al., "Surface Science of a Filled Polydimethylsiloxane-Based Alkoxysilane-Cured Elastomer: RTV11[1]", Journal of Colloid and Interface Science, vol. 210, 1999 (pp. 18-36), Article ID jcis.1998.5856, available online at http://www.idealibrary.com.

Cassé et al., "Laboratory screening of coating libraries for algal adhesion," Biofouling, vol. 23 (3/4), 2007 (pp. 267-276).

Chen et al., "Solvent Effects on the Surface Composition of Poly(dimethylsiloxane)-co-Polystyrene/Polystyrene Blends", Macromolecules, vol. 31, No. 26, 1998 (pp. 9328-9336).

Ekin et al., Combinatorial and High-Throughput Screening of the Effect of Siloxane Composition on the Surface Properties of Crosslinked Siloxane—Polyurethane Coatings, J. Comb. Chem., vol. 9, No. 1, 2007 (pp. 178-188).

Ekin et al., "Synthesis, formulation, and characterization of siloxane-polyurethane coatings for underwater marine applications using combinatorial high-throughput experimentation," J. Coat. Technol. Res., vol. 4, No. 4, 2007 (pp. 435-451).

Ho et al., "Polydimethylsiloxane-Urea-Urethane Copolymers with 1,4-Benzenedimethanol as Chain Extender", Macromolecules, vol. 26, No. 25, 1993 (pp. 7029-7036).

Holohan et al., "Monofunctional polydimethylsiloxane oligomers for graft copolymerization", Macromol. Chem. Phys., vol. 195, No. 9, 1994 (pp. 2965-2979).

Johnston et al., "Networks from $\alpha,\omega$-Dihydroxypoly(dimethylsiloxane) and (Tridecafluoro-1,1,2,2-tetrahydrooctyl)triethoxysilane: Surface Microstructures and Surface Characterization", Macromolecules, vol. 32, No. 24, 1999 (pp. 8173-8182).

Kawakami et al., "Silicone Macromers for Graft Polymer Synthesis", Polymer Journal, vol. 14, No. 11, 1982 (pp. 913-917).

Majumdar et al., "Thermoset Siloxane-Urethane Fouling Release Coatings," A.C.S. Symposium Series, vol. 957, 2007, (pp. 61-75).

Majumdar et al., "Thermoset Siloxane-Urethane Fouling Release Coatings", Department of Coatings and Polymeric Materials, Center for Nanoscale Science and Engineering, North Dakota State University, Fargo, ND 58105, Published Feb. 16, 2005, proceedings of Conference on Coatings, Orlando, Florida (9 pgs.).

Pieper et al., "Combinatorial approach to study the effect of acrylic polyol composition on the properties of crosslinked siloxane-polyurethane fouling-release coatings," J. Coat. Technol. Res., vol. 4, No. 4, 2007 (pp. 453-461).

Pike et al., "Water-Induced Surface Rearrangements of Poly(dimethylsiloxane-urea-urethane) Segmented Block Copolymers", Chem. Mater., vol. 8, No. 4, 1996 (pp. 856-860).

Stafslien et al., "Combinatorial materials research applied to the development of new surface coatings IV. A high-throughput bacterial biofilm retention and retraction assay for screening fouling-release performance of coatings," Biofouling, vol. 23, No. 1, 2007 (pp. 45-54).

Tezuka et al., "Environmentally induced Macromolecular Rearrangement on the Surface of Polyurethane-Polysiloxane Block Copolymers", J. Chem. Soc. Paraday Trans., vol. 87, 1991 (pp. 147-152).

Tezuka et al., "Environmentally Induced Macromolecular Rearrangement on the Surface of Polyurethane-Polysiloxane Graft Copolymers", *Journal of Colloid and Interface Science*, vol. 136, No. 2, May 1990 (pp. 408-414).

Thomas et al., "Silicones Containing Pendant Biocides for Antifouling Coatings", *Biofouling*, vol. 20, Nos. 4/5, Aug./Oct. 2004 (pp. 227-236 (whole document)).

Wynne et al., "Poly(dimethysiloxane)-Urea-Urethane Copolymers,", Synthesis and Surface Properties, Chapter 7, Ingoranic and Organometallic Polymers II, *Am. Chem. Soc.*, 1994 (pp. 64-80).

Zhuang et al., "Determination of the Distribution of Poly(dimethylsiloxane) Segment Lengths at the Surface of Poly[(dimethylsiloxane)-urethane]-Segmented Copolymers by Time-of-Flight Secondary Ion Mass Spectrometry", *Macromolecules*, vol. 30, No. 4, 1997 (pp. 1153-1157).

U.S. Appl. No. 60/934,093, filed Jun. 11, 2007, Webster et al.

U.S. Appl. No. 11/810,696, filed Jun. 6, 2007, Webster et al.

Abstract for JP 51-17554, "UV-Curable Antimicrobial Acrylic Coating Materials," Honda et al., publication date May 14, 1993, 1 page.

Abstract for Japanese Publication No. JP 11-222402, Publication Date Aug. 17, 1999, Patentee or Applicant listed as Osaka Gas Co. Ltd., 1 page.

Abstract for JP 2000-264803, "Silver Microbide-Containing Photopolymerizable Monomer Compositions, and Solventless UV- or Electron Beam-Curable Resin Compositions Containing Them," Takeuchi et al., publication date Sep. 26, 2000, 1 page.

Abstract for Japanese Publication No. JP 2001-029451 (A), "Antibacterial Urethral Catheter and Manufacture of the same," Toyo Boseki et al., publication date Feb. 6, 2001, 1 page.

Abstract for JP 2007246576 (A), "Water Paint Composition," Matsushita et al., publication date Sep. 27, 2007, 1 page.

Abstract for JP 60-09919, "Crosslinked Urethane Acrylate Polymer Particle-Containing Antimicrobial Coatings," Honda et al., publication date Jan. 18, 1994, 1 page.

Chen et al., "*Macromolecules*", 1995, vol. 28, pp. 1635-1642.

El-Hayek et al., Bacteriostatic polymer film immobilization. *Journal of biomedical materials research*. Part A 2006;79(4), pp. 874-881 (Plus Cover Sheet, 9 pages total).

Ha et al., *Journal of Macromolecular Science, Polymer Reviews*, 2005, vol. C45, 32 pgs.

Jiang et al., Preparation of crosslinked polystyrenes with quaternary ammonium and their antibacterial behavior *Reactive & Functional Polymers 2005*, vol. 62, 5 pages.

Lee et al., *Journal of Applied Polymer Science*, 2003, vol. 87, pp. 375-380.

Lenoir et al., Antimicrobial activity of polystyrene particles coated by photo-crosslinked block copolymers containing a biocidal polymethacrylate block. *e-Polymers 200*, 11 pages.

Mahoney et al., *Macromolecules*, 2002, vol. 35, pp. 5256-5266.

Patel et al., *Macromolecules*, 1988, vol. 21, pp. 2689-2696.

Schweizer, Triclosan: a widely used biocide and its link to antibiotics. *FEMS Microbiology Letters*, 2001, vol. 202, No. 1, pp. 1-7 (Plus Cover Sheet, 9 pages total).

Smith et al., *Macromolecules*, 1992, vol. 25, pp. 2575-2581.

Tanaka, et al., *Physical Review Letters*, 1992, vol. 68, No. 18, pp. 2794-2797.

Wynne et al., *ACS Symposium Series*, 1994, 572, pp. 64-80 (Plus Cover Sheet, 18 pages total).

\* cited by examiner

FUNCTIONALIZED POLYSILOXANE POLYMERS

RELATED PATENT APPLICATIONS

This application claims priority of U.S. Provisional Patent Application Ser. No. 60/703,532 (filed on Jul. 29, 2005), entitled "Polysiloxane-Polylactone Block Copolymers with Carbamate Linkages," the entire disclosure of which is herein incorporated by reference.

GOVERNMENT RIGHTS STATEMENT

The U.S. Government has a paid-up license in this invention and the right in limited circumstances to require the patent owner to license others on reasonable terms as provided for by the terms of Grant Nos. N00014-03-1-0702 and N00014-04-1-0597 awarded by the Department of Defense, Office of Naval Research.

BACKGROUND

Polysiloxanes have received a lot of attention since their introduction because of their many desirable properties such as low glass transition temperature, hydrophobicity, UV stability and high chain flexibility. However, pure polysiloxanes are often unsuitable, for some applications because of their poor mechanical properties. The polysiloxanes may be modified via functionalization or block copolymerization to provide more desirable mechanical properties.

Accordingly, it would be desirable to provide a modified polysiloxane, such as a modified poly(dimethyl siloxane) ("PDMS"), that is suitable for uses in marine coating applications, e.g., to protect against fouling of marine structures, such as ships, boats, piers, and the like.

SUMMARY

A number of functionalized polysiloxanes and polyorganosiloxanes are described herein. In particular, polysiloxanes that are terminated with a hydroxy functional carbamate group and polymers that include a subunit which is derived from a polysiloxane terminated with a hydroxy functional group are described. The functionalized polysiloxanes may include a carbamate linking group to link a polysiloxane segment to one or more other segments to form single or multi-functional (e.g., di, tri, tetra, etc.) polysiloxane polymers. The functionalized polysiloxanes may be useful in a variety of settings. For example, the functionalized polysiloxanes may be useful as an antifouling material in marine environments. The polymers may be included in a coating which is applied to a surface such as the hull of a ship, pier, etc. that is susceptible to fouling by microorganisms in a marine environment. The polymers may serve to prevent fouling from taking place and/or make it easier to remove fouling. In particular, the low surface energy and low modulus may provide easy release of marine organisms in fouling release coatings. It should be appreciated that other uses for functionalized polysiloxane polymers are contemplated as well (e.g., anti-graffiti coatings, biocompatible polymers, etc.).

In one embodiment, the functionalized polysiloxane may include functionalized poly(dimethyl siloxane) (PDMS). In another embodiment, the functionalized polysiloxane may include segments derived from one or more lactones to form a polysiloxane/polylactone block copolymer. One or more carbamate linking groups may be used to link the polysiloxane segment to the polylactone segment. The functionalized polysiloxane polymer may take a variety of forms. For example, the polymer may be an oligomer, block copolymer, or star branched block copolymer.

The functionalized polysiloxane polymer may be synthesized by first synthesizing an aminoalkyl terminated polysiloxane polymer. A cyclic carbonate is added to form a hydroxy alkyl carbamate terminated polysiloxane polymer. A lactone monomer such as ε-caprolactone may be added to form a polysiloxane/polylactone polymer.

A coating composition may be prepared that includes the functionalized polysiloxane polymer. In one embodiment, the coating composition may prepared by reacting an isocyanate functionalized compound (e.g., polyisocyanate), an alcohol (e.g., polyol), and the hydroxy terminated polysiloxane polymer. The alcohol is typically a relatively low hydroxy equivalent weight polyol, e.g., with a hydroxy equivalent weight of no more than about 500. The isocyanate functionalized compound and/or the polyol can serve to cross-link the polysiloxane polymer. The hydroxy terminated polysiloxane polymer may be the polymer that is formed prior to addition of the lactone monomer (i.e., the polysiloxane polymer does not include any segments derived from a lactone) or after addition of the lactone monomer (i.e., the polysiloxane includes segments derived from a lactone).

In another embodiment, a method for preparing and using the coating composition comprises adding isocyanate reaction catalyst to a composition comprising polyol, polyisocyanate, and the functionalized polysiloxane polymer to form a coating composition and applying the coating composition to a substrate. The coating composition cures on the substrate to form a polymeric material that may provide for easy fouling release.

DETAILED DESCRIPTION

Figure 1A:
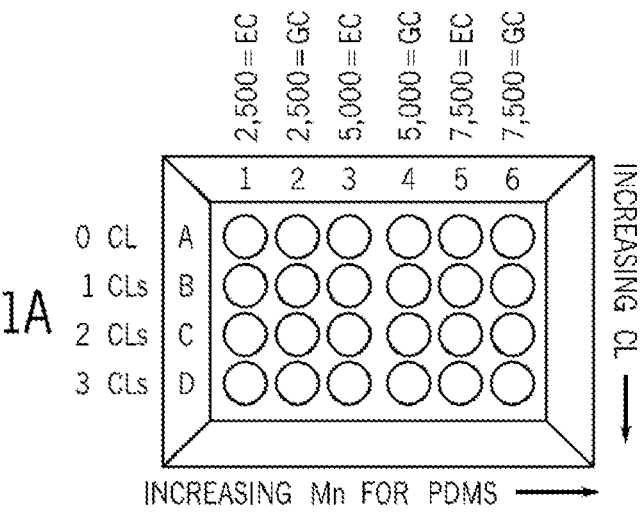
FIG. 1 shows experimental designs for the synthesis of siloxane libraries with (a) the siloxane molecular weight varied from 2500 to 7500 with EC and GC used to form the carbamate link; (b) the PDMS molecular weight is varied from 10,000 to 35,000 with the carbamate link derived from EC; and (c) the PDMS molecular weight is varied from 10,000 to 35,000 with the carbamate link derived from GC.

A variety of functionalized polysiloxanes are described herein. The polysiloxanes may be useful in a variety of settings. For example, the functionalized polysiloxanes may be used to provide anti-fouling materials which can be used to prevent microbiological fouling of surfaces in a marine environment. The low surface energy and low modulus make these materials particularly suitable for antifouling/foul release applications as well as other applications. The functionalized polysiloxanes may include a carbamate linking group which links the polysiloxane segment with other functional groups or segments to form oligomers, block copolymers, star branched block copolymers, etc. The functionalized polysiloxane polymers may have the following general formula:

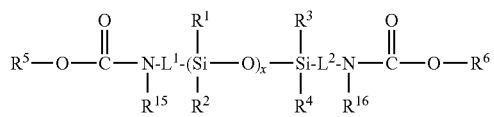

Referring to the formula above, $R^1$, $R^2$, $R^3$, $R^4$, $R^{15}$ and $R^{16}$ may be independently hydrogen, $C_1$-$C_{10}$ alkyl, $C_1$-$C_{10}$ fluoro-substituted alkyl, cyclopentyl, cyclohexyl, benzyl, toluoyl, xylyl and/or phenyl. In one embodiment, $R^1$, $R^2$, $R^3$, and $R^4$ may be methyl and $R^{15}$ and $R^{16}$ may be hydrogen. $L^1$ and $L^2$ may be linking groups such as linear or branched alkylene having from 2 to 10 carbon atoms, or, desirably, 2 to 6 carbon atoms. In one embodiment $L^1$ and $L^2$ may be propylene. It should be appreciated that any of a number of suitable linking groups may be used for $L^1$ and $L^2$.

$R^5$ and $R^6$ may each be a hydroxy-substituted terminal group. In one embodiment, $R^5$ and $R^6$ may be a hydroxy-alkyl terminal group. For example, $R^5$ and $R^6$ may have the formulas HO—$R^7$— and —$R^8$—OH, respectively, where $R^7$ and $R^8$ are linear and/or branched alkylene (e.g., ethylene). In some embodiments, $R^7$ and $R^8$ may be linear and/or branched alkylene which is substituted with one or more hydroxy and/or vinyl groups (where the vinyl group(s) may be substituted with one or more alkyl groups). For example, $R^5$ and/or $R^6$ may be a hydroxymethylethylene or vinylethylene group. In another embodiment, $R^5$ and $R^6$ may have the respective formulas shown below where $R^7$, $R^9$, $R^{11}$, and $R^{13}$ may be linear and/or branched alkylene and $R^8$, $R^{10}$, $R^{12}$, and $R^{14}$ may be hydrogen or linear and/or branched $C_1$-$C_{10}$ alkyl. b, e, z, and u may be an integer from 0 to 6 and a, d, y, and t may be an integer from 1 to 300. m and n may be 0 or 1.

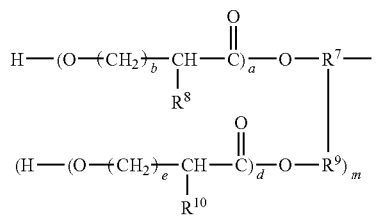

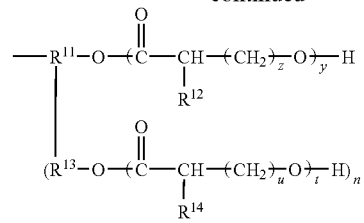

In one embodiment, b, e, z, and u may be 4; $R^8$, $R^{10}$, $R^{12}$, and $R^{14}$ may be hydrogen; $R^7$ and $R^{11}$ may be —($CH_2$)—CH—; $R^9$ and $R^{13}$ are —$CH_2$—; a, d, y, and t may be an integer from 1 to 10; and m and n may be 1. Also a, d, y, and t may be 1 to 2.

In another embodiment, b, e, z, and u may be 4; $R^8$, $R^{10}$, $R^{12}$, and $R^{14}$ may be hydrogen; $R^7$ and $R^{11}$ may be —($CH_2$)$_2$—; a and y may be an integer from 1 to 10; and m and n may be 0. Also, a and y may be 1 to 2.

The functionalized polysiloxane polymer may be synthesized by first synthesizing an amino alkyl terminated polysiloxane polymer. A cyclic carbonate such as glycerine carbonate, ethylene carbonate, propylene carbonate, butylenes carbonate, vinyl ethylene carbonate, is added to form a hydroxy alkyl carbamate terminated polysiloxane polymer. A lactone monomer such as ε-caprolactone is added to form a polysiloxane/polylactone polymer. A general structural formula for suitable cyclic carbonates that may be used is shown below. In the formula "s" may be 2-4 and $R^{20}$ may be hydrogen, alkyl, vinyl, alkyl-substituted vinyl, or hydroxy-substituted alkyl.

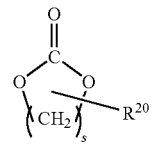

The molecular weight of the polymer may be varied to provide a range of physical properties. In one embodiment, the average molecular weight of the polymer is changed by varying the length of the polysiloxane segment (i.e., the value of x in the formula above). In one embodiment, the value of x is such that the polymer has an average molecular weight of about 1,000 to 100,000, desirably, about 10,000 to 75,000, or, suitably, about 20,000 to 50,000.

The carbamate linked PDMS oligomers and block copolymers may also be incorporated into thermoset siloxane-polyurethane coatings. The coatings may be formed by mixing an isocyanate functionalized compound, a polyol (e.g., polycaprolactone polyol such as Tone Polyol 0305 available from Dow Chemical), and the hydroxy terminated polysiloxane polymer. Specifically, the polyol, hydroxy terminated polysiloxane, and a pot-lift extender such as 2,4-pentanedione, alkane-2,4-dione, N,N-dialkyl acetoacetamide, and/or alkyl acetoacetate are initially mixed together. The isocyanate functionalized compound and a catalyst such as DBTDAc, dialkyl tin dicarboxylate, trialkyltin hydroxide, dialkyltin oxide, dialkyltin dialkoxide, and/or dialkyltin dihalide, are then combined with mixture. The coating can then be applied to a surface once the viscosity of the mixture has reached a sufficient level.

Any suitable isocyanate functionalized compound may be used to form the polyurethane coating. Many isocyanate functionalized compounds are available commercially, but their exact composition is protected as a trade secret. Examples of suitable isocyanate functionalized compounds include alkyl diisocyanates and cycloalkyl diisocyanates such as isophorone diisocyanate, 1,6-hexamethylene diisocyanate, methylene dicyclohexyl diisocyanate, xylylene diisocyanate, trans-1,4 cyclohexane diisocyanate, tetramethyl xylylene diisocyanate, isopropenyl dimethylbenzyl diisocyanate, trimethylhexamethylene diisocyanate, 2,2,4-(2,4,4)trimethylhexamethylene diisocyanate, ethylene diisocyanate, 1,4-tetramethylene diisocyanate, 1,12-dodecane diisocyanate, cyclobutane-1,3 diisocyanate, cyclohexane-1,3 diisocyanate, cyclohexane-1,4 diisocyanate, 1-isocyanato-3,3,5-trimethyl-5-isocyanoatom-ethyl cyclohexane, 2,4-hexahydrotoluene diisocyanate, 2,6-hexahydrotoluene diisocyanate, hexahydro-1,3-phenylene diisocyanate, hexahydro-1,4-phenylene diisocyanate, perhydro-2,4'-diphenylmethane diisocyanate, and norbornane diisocyanate and polyisocyanates such as isophorone diisocyanate trimer (available commercially as Tolonate XIDT-70B, a product of Rhodia PPMC and as Desmodur Z4470, a product of Bayer AG), hexamethylene diisocyanate trimer (available commercially as Tolonate AT, a product of Rhodia PPMC and as Desmodur N3390, a product of Bayer AG), and biurets and allophanates based on the diisocyanates exemplified supra.

Particularly suitable examples of polyisocyanates that may be employed in the present coating compositions include polyisocyanates that have at least three isocyanate groups to facilitate cross linking of the polymeric material. In one embodiment, the polyisocyanate may include an isophorone-based polyisocyanate. In another embodiment, the polyisocyanate may having an isocyanate equivalent weight of about 150 to 600 or, desirably about 250 to 450. The coating compositions may include about 30 wt % to 85 wt. % or, desirably, about 40 wt. % to 75 wt. % polyisocyanate, based on the total solids content of the polymeric material in the coating composition.

A wide variety of polyols may also be used to form the coating. For example, suitable polyols may include polyester polyols, polyether polyols, polycarbonate polyols, and acrylic polyols. In one embodiment, the polyol may include polyol having at least three hydroxy groups. In another embodiment, the polyol may be a polycaprolactone triol. In certain embodiments, the polyol may have a hydroxy equivalent weight of no more than about 500, or, desirably, no more than about 250. Other examples of suitable polyols include glycerol, alkylene glycols (e.g., ethylene glycol, diethylene glycol, triethylene glycol and neopentylglycol), pentaerythritol, trimethylolethane, trimethylolpropane, sorbitol, cyclohexanediols, inositol, and polyglycerol.

The coating may have a number of foul release characteristics such as a high water contact angle after being immersed for 30 days (i.e., this is referred to herein as the water contact angle after immersion) and a low release force after water immersion, which indicate that the coating may be useful as a foul release/anti-fouling material. For example, in one embodiment, the coating may have a water contact angle after immersion of at least about 90°, desirably at least about 105°, or suitably, at least about 110°. In another embodiment, the coating may have a release force after water immersion of no more than about 30 N, desirably, no more than about 20 N, or, suitably, no more than about 15 N.

EXAMPLES

The following examples are provided to further describe the subject matter disclosed herein. The following examples should not be considered as being limiting in any way.

Materials Used in Examples: Bis(3-aminopropyl)-tetramethyldisiloxane (BAPTMDS) and octamethylcyclotetrasiloxane ($D_4$) are obtained from Gelest Inc. 2,4-Pentanedione, ethyl 3-ethoxypropionate (EEP), dibutyltin diacetate (DBTDAc), tin(II)-2-ethylhexanoate, ethylene carbonate (EC) and benzyltrimethylammonium hydroxide (40% solution in methanol) are obtained from Aldrich. Tone Polyol 0305 (Polycaprolactone (PCL) triol (hydroxyl equiv. wt. 180)) is obtained from Dow Chemical. Tolonate XIDT 70B isocyanate (i.e., isophorone diisocyanate trimer having an isocyanate equivalent weight of 342) is obtained from Rhodia. Methyl n-amyl ketone (MAK) is obtained from Eastman Corp. Caprolactone (CL) is obtained from Solvay Chemicals. Glycerine carbonate (GC) is obtained from Huntsman. All materials are used as received without further purification.

Example 1

In this example, libraries of carbamate linked PDMS oligomers and block copolymers with polycaprolactone blocks are synthesized.

Figure 1B:
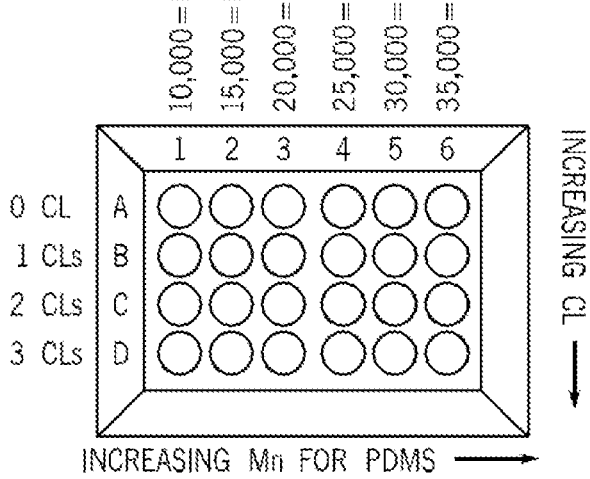
Figure 1C:
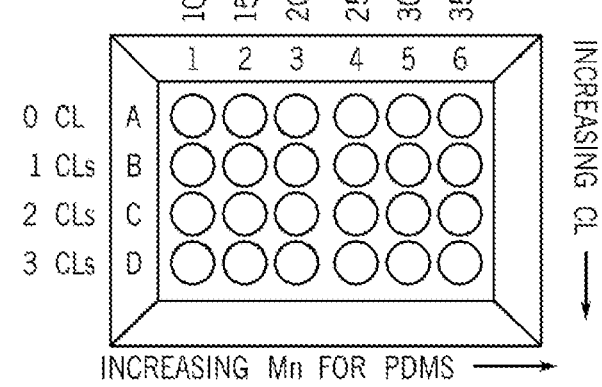

Experimental designs for the synthesis of the siloxane libraries are prepared using Library Studio. The designs are shown in FIG. 1. In library (a) the siloxane molecular weight is varied from 2500 to 7500 with EC and GC used to form the carbamate link. In libraries (b) and (c) the PDMS molecular weight is varied from 10,000 to 35,000 with the carbamate link derived from EC in library (b) and GC in library (c).

Synthesis of the functional oligomers and block copolymers is carried out using a Symyx batch reactor system. A robotic pipet dispenses the reagents into individual vials according to the calculated recipe.

In the first step of the reaction scheme, synthesis of 3-aminopropyl terminated PDMS oligomers is done as follows. Benzyltrimethylammonium hydroxide catalyst (0.1% by solids) is mixed with $D_4$. Since benzyltrimethylammonium hydroxide is received in 40% methanol, methanol is removed under vacuum. The synthesis is mainly done by reacting the specified amount of $D_4$ and BAPTMS in the presence of benzyltrimethylammonium catalyst. The molecular weights of the oligomers are adjusted by changing the ratio of $D_4$ to BAPTMDS. The reaction is run at 80° C. for 10 hours. After completion of the reaction, the temperature is increased to 170° C. and kept at that temperature for 1 hour to decompose the catalyst.

To synthesize carbamate linked PDMS oligomers and block copolymers, stoichiometric amounts of EC and GC are added to the vials and the reaction is run at 80° C. for 10 hours. Next, the specified amount of caprolactone monomer is added to the vials. 1 drop of tin(II)-2-ethyl hexanoate catalyst in 10% toluene solution is added to the solutions. The reaction is run at 80° C. for 10 hours, and then the reaction temperature is increased to 120° C. and held for 10 more hours. Schemes 1 & 2 show examples of how to synthesize the polymers described in this example.

Scheme 1: Synthesis scheme of carbamate linked tetra functional PDMS oligomers and block copolymers.
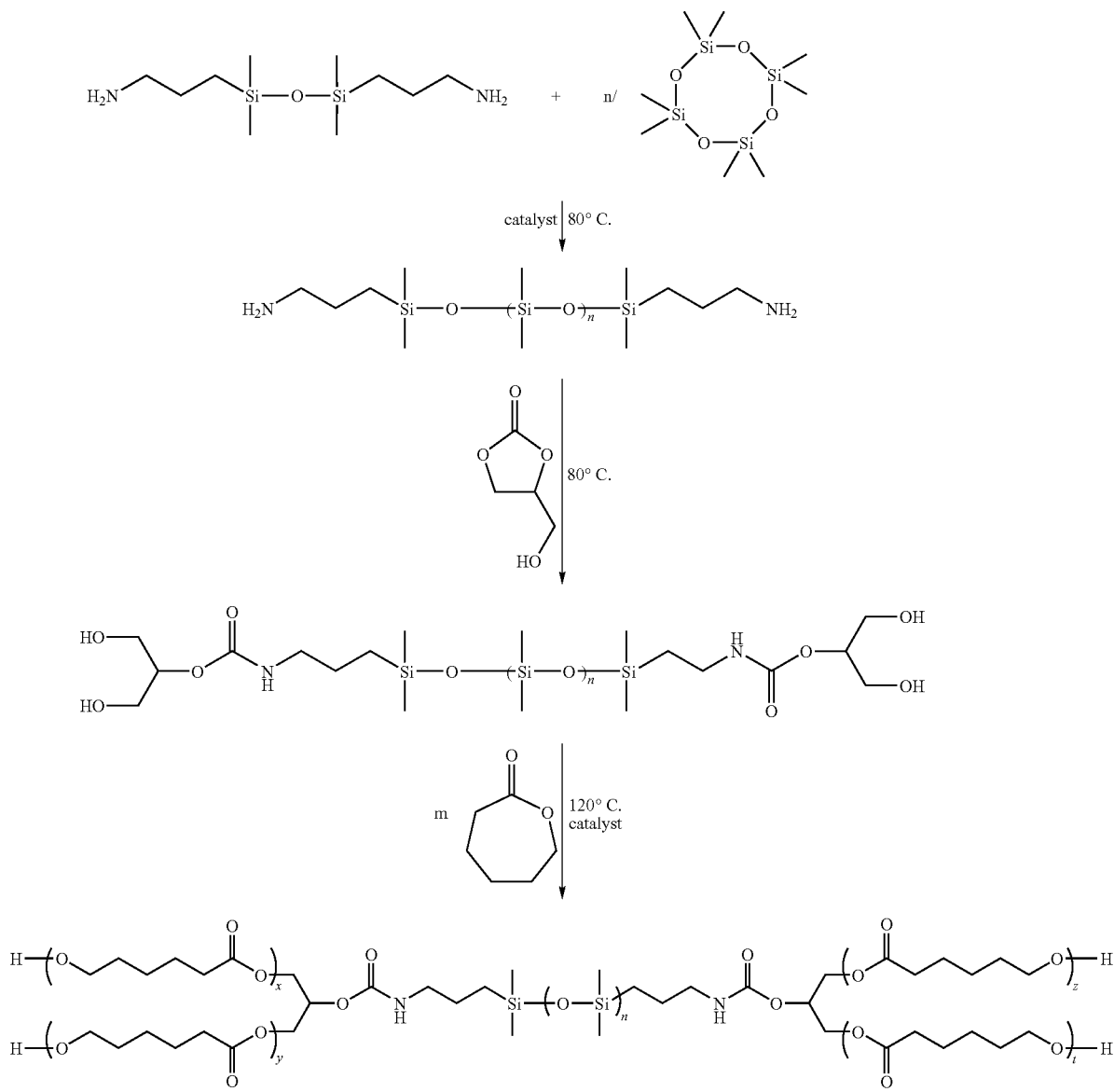
Scheme 2: Synthesis scheme of carbamate linked di functional PDMS oligomers and block copolymers.
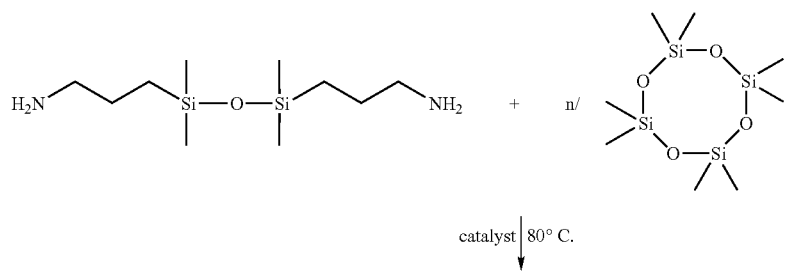

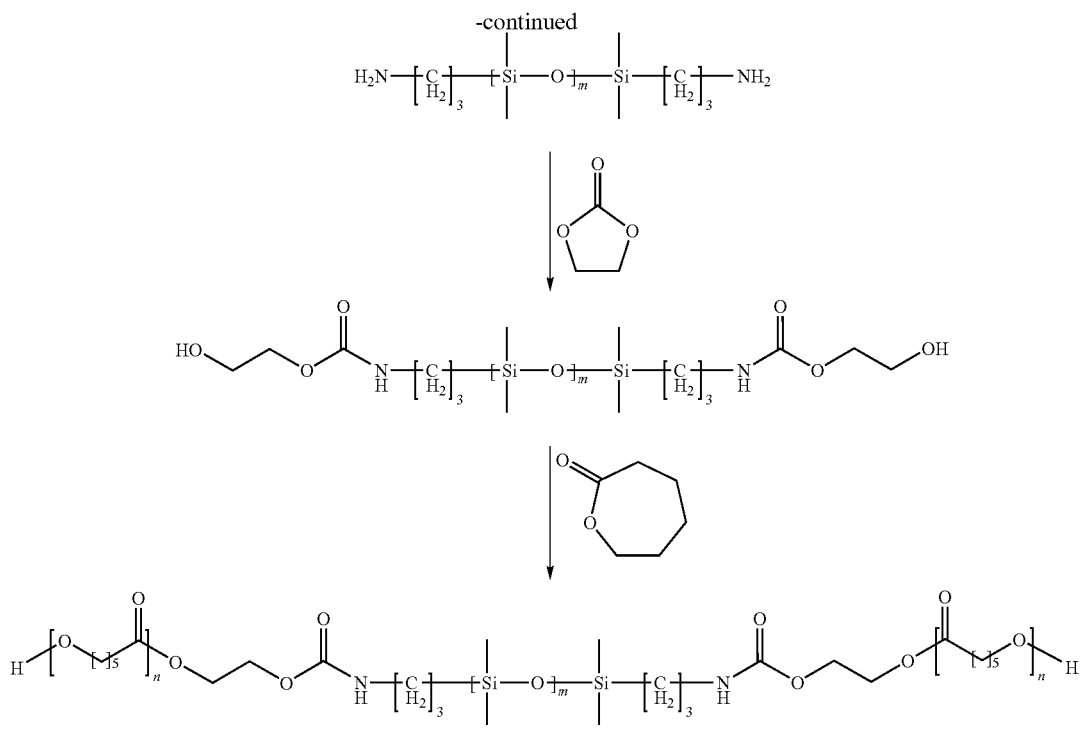

The formulation data for each compound prepared in the libraries a-c (see FIG. 1) are shown in Tables 1-3 below.

TABLE 1

| | Target PDMS Mn | $D_4$ (mg) | BAPTMDS (mg) | EC (mg) | GC (mg) | CL (mg) |
|---|---|---|---|---|---|---|
| A1 | 2500 | 5000.00 | 497.05 | 387.26 | 0.00 | 0.00 |
| A2 | 2500 | 5000.00 | 497.05 | 0.00 | 519.32 | 0.00 |
| A3 | 5000 | 5000.00 | 248.52 | 184.87 | 0.00 | 0.00 |
| A4 | 5000 | 5000.00 | 248.52 | 0.00 | 247.92 | 0.00 |
| A5 | 7500 | 5000.00 | 165.68 | 121.30 | 0.00 | 0.00 |
| A6 | 7500 | 5000.00 | 165.68 | 0.00 | 162.67 | 0.00 |
| B1 | 2500 | 5000.00 | 497.05 | 387.26 | 0.00 | 937.82 |
| B2 | 2500 | 5000.00 | 497.05 | 0.00 | 519.32 | 1834.48 |
| B3 | 5000 | 5000.00 | 248.52 | 184.87 | 0.00 | 462.95 |
| B4 | 5000 | 5000.00 | 248.52 | 0.00 | 247.92 | 915.27 |
| B5 | 7500 | 5000.00 | 165.68 | 121.30 | 0.00 | 307.24 |
| B6 | 7500 | 5000.00 | 165.68 | 0.00 | 162.67 | 609.72 |
| C1 | 2500 | 5000.00 | 497.05 | 387.26 | 0.00 | 1406.74 |
| C2 | 2500 | 5000.00 | 497.05 | 0.00 | 519.32 | 2751.72 |
| C3 | 5000 | 5000.00 | 248.52 | 184.87 | 0.00 | 694.42 |
| C4 | 5000 | 5000.00 | 248.52 | 0.00 | 247.92 | 1372.91 |
| C5 | 7500 | 5000.00 | 165.68 | 121.30 | 0.00 | 460.87 |
| C6 | 7500 | 5000.00 | 165.68 | 0.00 | 162.67 | 914.58 |
| D1 | 2500 | 5000.00 | 497.05 | 387.26 | 0.00 | 1875.65 |
| D2 | 2500 | 5000.00 | 497.05 | 0.00 | 519.32 | 3668.96 |
| D3 | 5000 | 5000.00 | 248.52 | 184.87 | 0.00 | 925.89 |
| D4 | 5000 | 5000.00 | 248.52 | 0.00 | 247.92 | 1830.55 |
| D5 | 7500 | 5000.00 | 165.68 | 121.30 | 0.00 | 614.49 |
| D6 | 7500 | 5000.00 | 165.68 | 0.00 | 162.67 | 1219.44 |

\* Coating Libraries 101046, 101047, 101048 and 101049 (see Tables 4 and 5) were formulated using this siloxane library.

TABLE 2

| | Target PDMS Mn | $D_4$ (mg) | BAPTMDS (mg) | EC (mg) | GC (mg) | CL (mg) |
|---|---|---|---|---|---|---|
| A1 | 10000 | 4684.40 | 116.42 | 84.55 | 0.00 | 0.00 |
| A2 | 15000 | 4684.40 | 77.61 | 55.91 | 0.00 | 0.00 |
| A3 | 20000 | 4684.40 | 58.21 | 41.76 | 0.00 | 0.00 |
| A4 | 25000 | 4684.40 | 46.57 | 33.33 | 0.00 | 0.00 |
| A5 | 30000 | 4684.40 | 38.81 | 27.73 | 0.00 | 0.00 |
| A6 | 35000 | 4684.40 | 33.26 | 23.74 | 0.00 | 0.00 |
| B1 | 10000 | 4588.80 | 114.04 | 82.83 | 0.00 | 219.19 |
| B2 | 15000 | 4684.40 | 77.61 | 55.91 | 0.00 | 144.94 |
| B3 | 20000 | 4684.40 | 58.21 | 41.76 | 0.00 | 108.26 |
| B4 | 25000 | 4684.40 | 46.57 | 33.33 | 0.00 | 86.40 |
| B5 | 30000 | 4684.40 | 38.81 | 27.73 | 0.00 | 71.88 |
| B6 | 35000 | 4684.40 | 33.26 | 23.74 | 0.00 | 61.54 |
| C1 | 10000 | 4397.60 | 109.29 | 79.38 | 0.00 | 322.07 |
| C2 | 15000 | 4684.40 | 77.61 | 55.91 | 0.00 | 217.41 |
| C3 | 20000 | 4684.40 | 58.21 | 41.76 | 0.00 | 162.40 |
| C4 | 25000 | 4684.40 | 46.57 | 33.33 | 0.00 | 129.60 |
| C5 | 30000 | 4684.40 | 38.81 | 27.73 | 0.00 | 107.82 |
| C6 | 35000 | 4684.40 | 33.26 | 23.74 | 0.00 | 92.31 |
| D1 | 10000 | 4302.00 | 106.91 | 77.65 | 0.00 | 411.53 |
| D2 | 15000 | 4588.80 | 76.03 | 54.77 | 0.00 | 289.89 |
| D3 | 20000 | 4684.40 | 58.21 | 41.76 | 0.00 | 216.53 |
| D4 | 25000 | 4684.40 | 46.57 | 33.33 | 0.00 | 172.80 |
| D5 | 30000 | 4684.40 | 38.81 | 27.73 | 0.00 | 143.76 |
| D6 | 35000 | 4684.40 | 33.26 | 23.74 | 0.00 | 123.08 |

\* Coating Libraries 101107, 101108, 101109 and 101110 (see Tables 4 and 5) were formulated using this siloxane library.

TABLE 3

| | Target PDMS Mn | $D_4$ (mg) | BAPTMDS (mg) | EC (mg) | GC (mg) | CL (mg) |
|---|---|---|---|---|---|---|
| A1 | 10000 | 4684.40 | 116.42 | 0.00 | 113.39 | 0.00 |
| A2 | 15000 | 4684.40 | 77.61 | 0.00 | 74.98 | 0.00 |
| A3 | 20000 | 4684.40 | 58.21 | 0.00 | 56.01 | 0.00 |
| A4 | 25000 | 4684.40 | 46.57 | 0.00 | 44.69 | 0.00 |
| A5 | 30000 | 4684.40 | 38.81 | 0.00 | 37.18 | 0.00 |
| A6 | 35000 | 4684.40 | 33.26 | 0.00 | 31.83 | 0.00 |
| B1 | 10000 | 4302.00 | 106.91 | 0.00 | 104.13 | 438.37 |
| B2 | 15000 | 4493.20 | 74.44 | 0.00 | 71.92 | 289.89 |
| B3 | 20000 | 4636.60 | 57.62 | 0.00 | 55.43 | 216.53 |
| B4 | 25000 | 4684.40 | 46.57 | 0.00 | 44.69 | 172.80 |
| B5 | 30000 | 4684.40 | 38.81 | 0.00 | 37.18 | 143.76 |
| B6 | 35000 | 4684.40 | 33.26 | 0.00 | 31.83 | 123.08 |
| C1 | 10000 | 4015.20 | 99.79 | 0.00 | 97.19 | 603.88 |
| C2 | 15000 | 4397.60 | 72.86 | 0.00 | 70.39 | 417.08 |
| C3 | 20000 | 4541.00 | 56.43 | 0.00 | 54.29 | 321.48 |
| C4 | 25000 | 4636.60 | 46.09 | 0.00 | 44.24 | 259.20 |
| C5 | 30000 | 4684.40 | 38.81 | 0.00 | 37.18 | 215.64 |
| C6 | 35000 | 4684.40 | 33.26 | 0.00 | 31.83 | 184.62 |
| D1 | 10000 | 4015.20 | 99.79 | 0.00 | 97.19 | 751.50 |
| D2 | 15000 | 4302.00 | 71.28 | 0.00 | 68.86 | 544.28 |
| D3 | 20000 | 4397.60 | 54.65 | 0.00 | 52.58 | 419.80 |
| D4 | 25000 | 4541.00 | 45.14 | 0.00 | 43.33 | 342.07 |
| D5 | 30000 | 4636.60 | 38.41 | 0.00 | 36.80 | 287.52 |
| D6 | 35000 | 4684.40 | 33.26 | 0.00 | 31.83 | 246.16 |

* Coating Libraries 101119, 101120, 101121 and 101122 (see Tables 4 and 5) were formulated using this siloxane library.

Example 2

In this example, the libraries of carbamate linked PDMS oligomers and block copolymers with polycaprolactone blocks synthesized according to Example 1 are incorporated into thermoset siloxane-polyurethane coatings. The effect of polycaprolactone blocks, percent load of oligomers and molecular weight of the PDMS on the properties of these coatings is evaluated.

Coating formulations are composed of a siloxane from the library prepared as described in Example 1, Tone Polyol 0305 (polyol), 2,4-pentanedione, DBTDAc catalyst and Tolonate XIDT 70B (isocyanate crosslinker). Stock solutions of 30% siloxane polymer (based on the total solids content of the coating composition) from the Ex. 1 library in EEP and Tone polyol in 10% MAK are prepared. A 1% solution of the catalyst DBTDAc is prepared in MAK.

Coating formulations are prepared by adding 10%, 20%, 30% and 40% by weight of siloxane from the library (wt. % of the total of the siloxane, polyol, and polyisocyanate, i.e., wt. % of the total solids content) into the formulations. Since each polymer is included at four different inclusion levels, a total of 288 coatings are formulated. The amount of catalyst DBTDAc is adjusted to 0.075% by solids for all coating formulations. The stoichiometric ratio of isocyanate to hydroxyl functional groups is kept as 1.1:1.0. To all formulations 10% by solids 2,4-pentanedione (pot life extender) is added.

Using an automated formulation system, the siloxane library, polyol, and 2,4-pentanedione are added to the vials first and mixed overnight. After overnight mixing isocyanate crosslinker and catalyst are added to the vials and continued mixing until sufficient viscosity is obtained for coating application.

The coating application is carried out using an automated coating application system. The formulations are applied in array format to 4" by 8" aluminum panels. After the application, the panels are left at room temperature for curing overnight. The panels are then placed into the oven for complete curing for 45 minutes at 80° C.

The surface energy and pseudo-barnacle pull-off adhesion is determined for each coating. Contact angles of water and methylene iodide are determined using an automated surface energy system and used to determine the surface energy with Owens-Wendt method. Coating surface energies are measured initially and after 30 days of water immersion. To determine the adhesive strength of epoxy to a coating surface (pseudo-barnacle adhesion) a Symyx automated pull-off adhesion system is used. Pull-off adhesion of the coatings is measured initially and after 30 days of water immersion.

Figure 2:
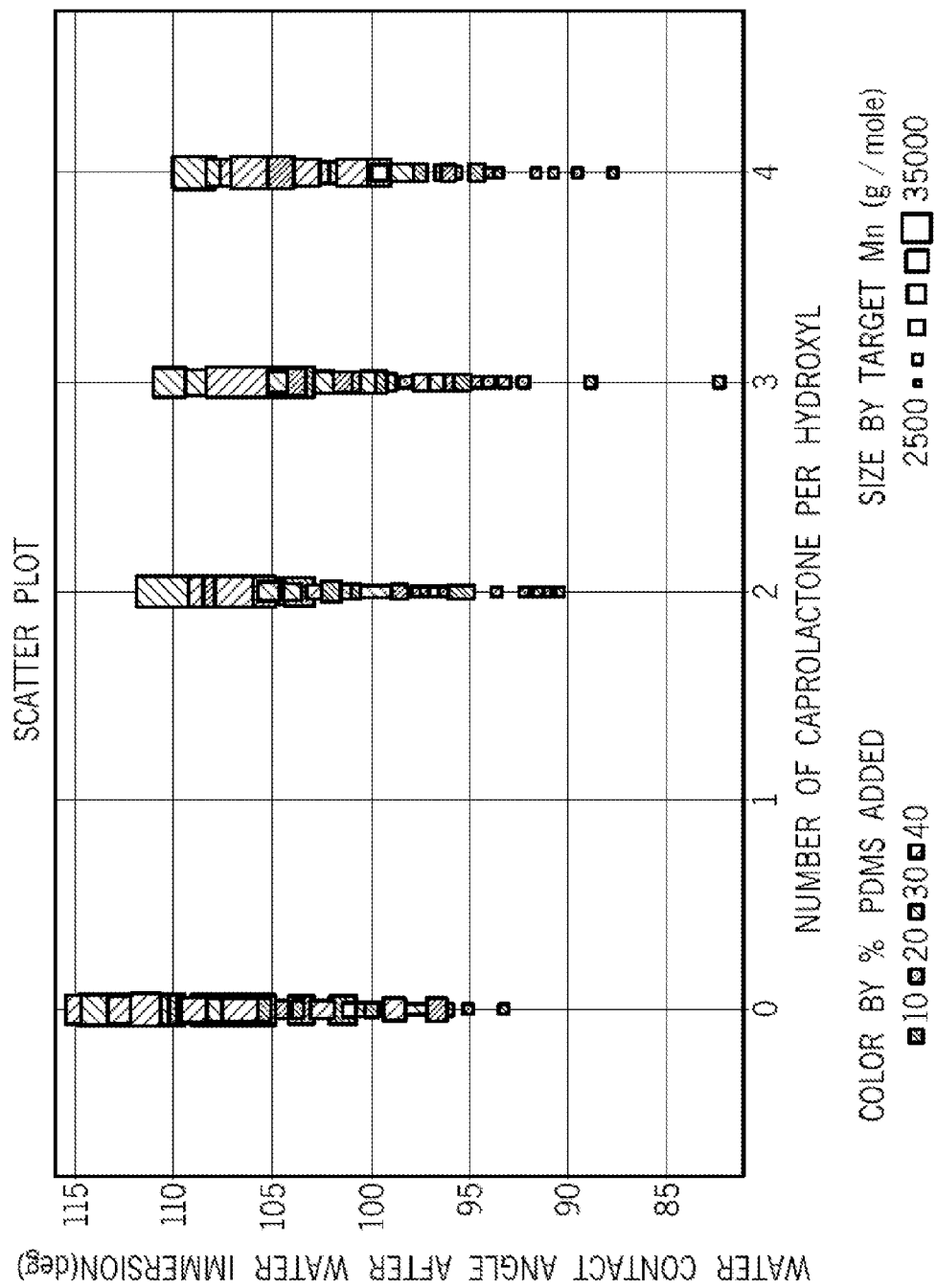
FIG. 2 shows a plot of water contact angle (WCA) versus number of caprolactones per hydroxyl for panels coated with polysiloxane-polyurethane materials following 30 days water immersion.
Figure 3:
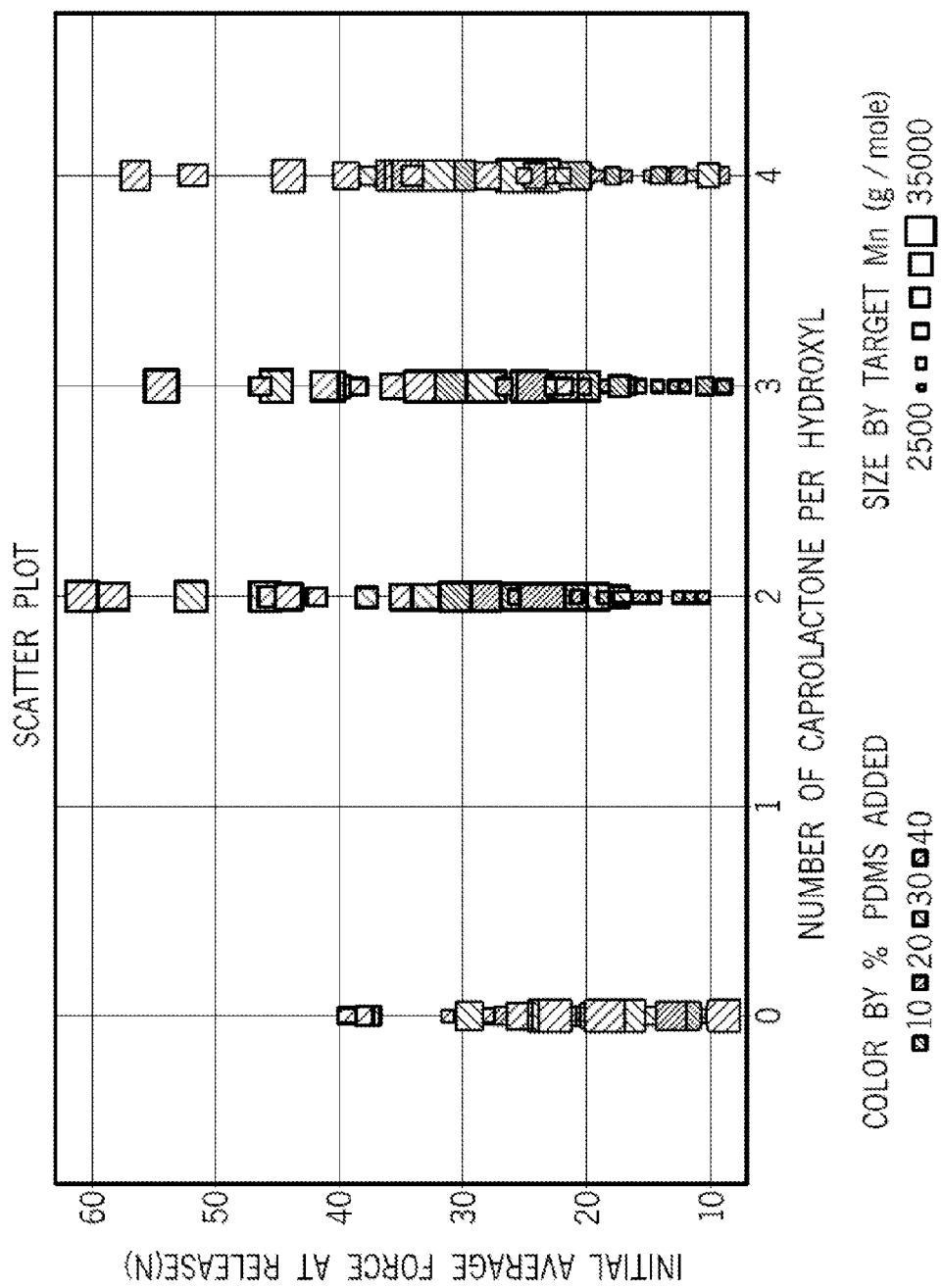
FIG. 3 shows a plot of initial average force at release versus number of caprolactones per hydroxyl for panels coated with polysiloxane-polyurethane materials following 30 days water immersion.
Figure 4:
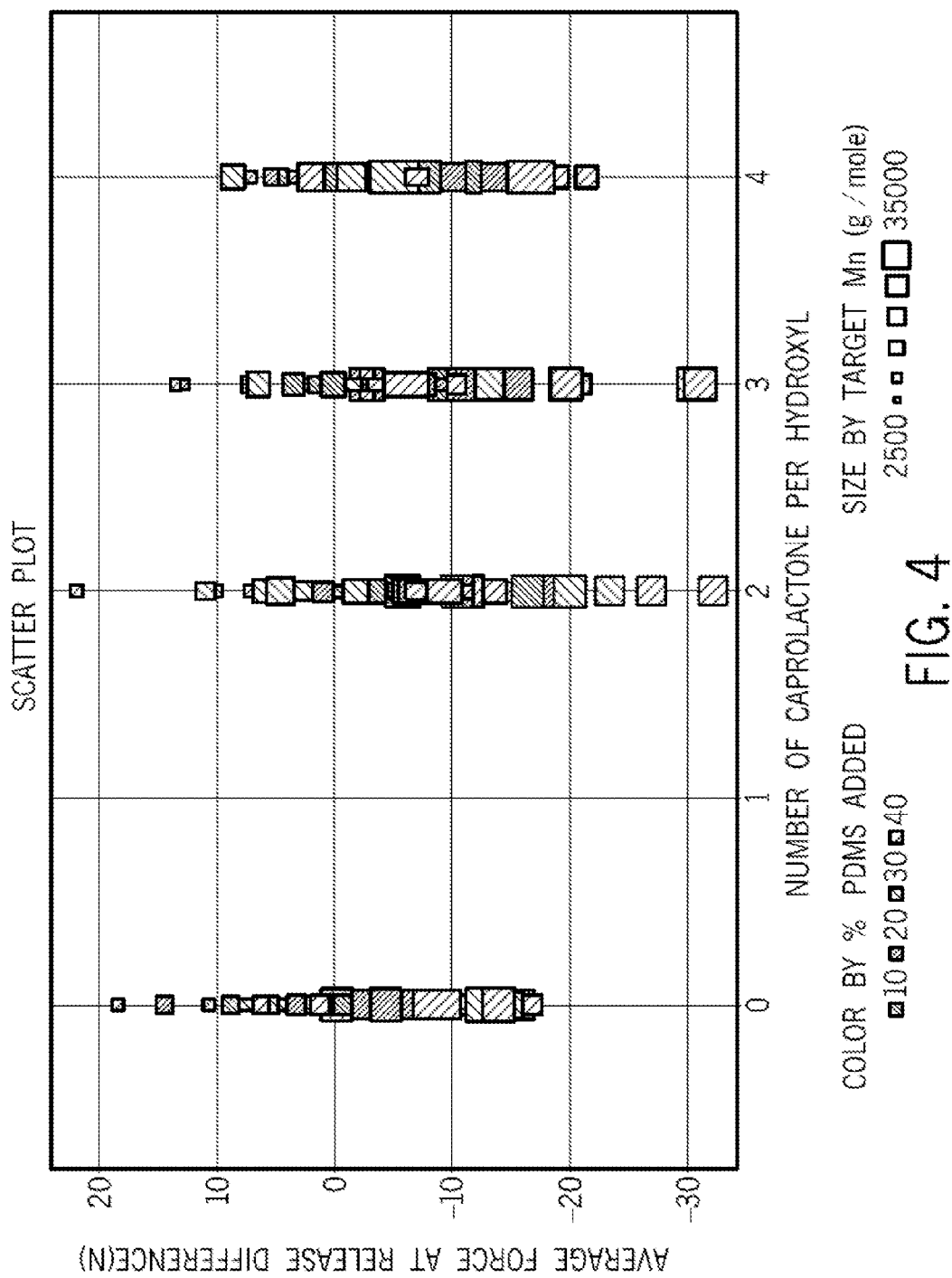
FIG. 4 shows a plot of average force at release versus number of caprolactones per hydroxyl for panels coated with polysiloxane-polyurethane materials following 30 days water immersion.

The coatings were uniform and stable before and after water immersion. All of the coatings showed at least some hydrophobic properties. The results of the tests are shown in FIGS. 2-4 below. The coating formulations and numerical results of the tests are shown in FIG. 4.

As shown in FIG. 2, the water contact angle (WCA) data following immersion indicates that most of the coatings remain hydrophobic (WCA>90), which means that PDMS predominates on the surface and that the coatings are stable. WCA change following water immersion is generally within ±5°. Generally, WCA of the coatings increases as the number average molecular weight of the PDMS oligomers increases. Also, generally speaking, increasing the number of caprolactone blocks decreases the WCAs.

As shown in FIG. 2, the coatings having the highest WCAs are achieved with the polymers which have no caprolactone units. As shown in FIG. 3, the initial average force at release for the coatings showed a slight increase between carbamate linked functional oligomers and block copolymers.

As shown in FIG. 4, the average force at release measured after water immersion decreases most of the time. Average force at release of carbamate linked PDMS block copolymers decreases more than the average force at release of carbamate linked PDMS oligomers.

Example 3

In this example, the coatings prepared in Example 2 are compared to a number of coatings using conventional polymers prepared as shown in Scheme 3 below. The molecular weight of the PDMS and the number of caprolactone units per end group are varied to form 48 conventional polymers. Each of the 48 conventional polymers is used at four different inclusion levels (10%, 20%, 30%, and 40% based on the total solids content of the coating composition) to form 192 coatings in a manner similar to that described in Example 2.

Scheme 3

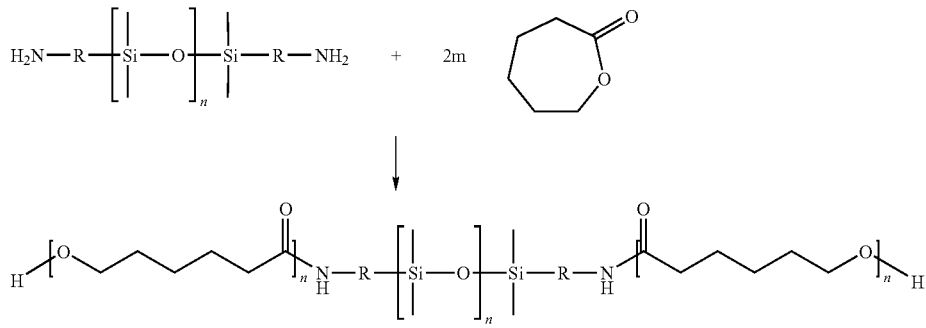

Figure 5:
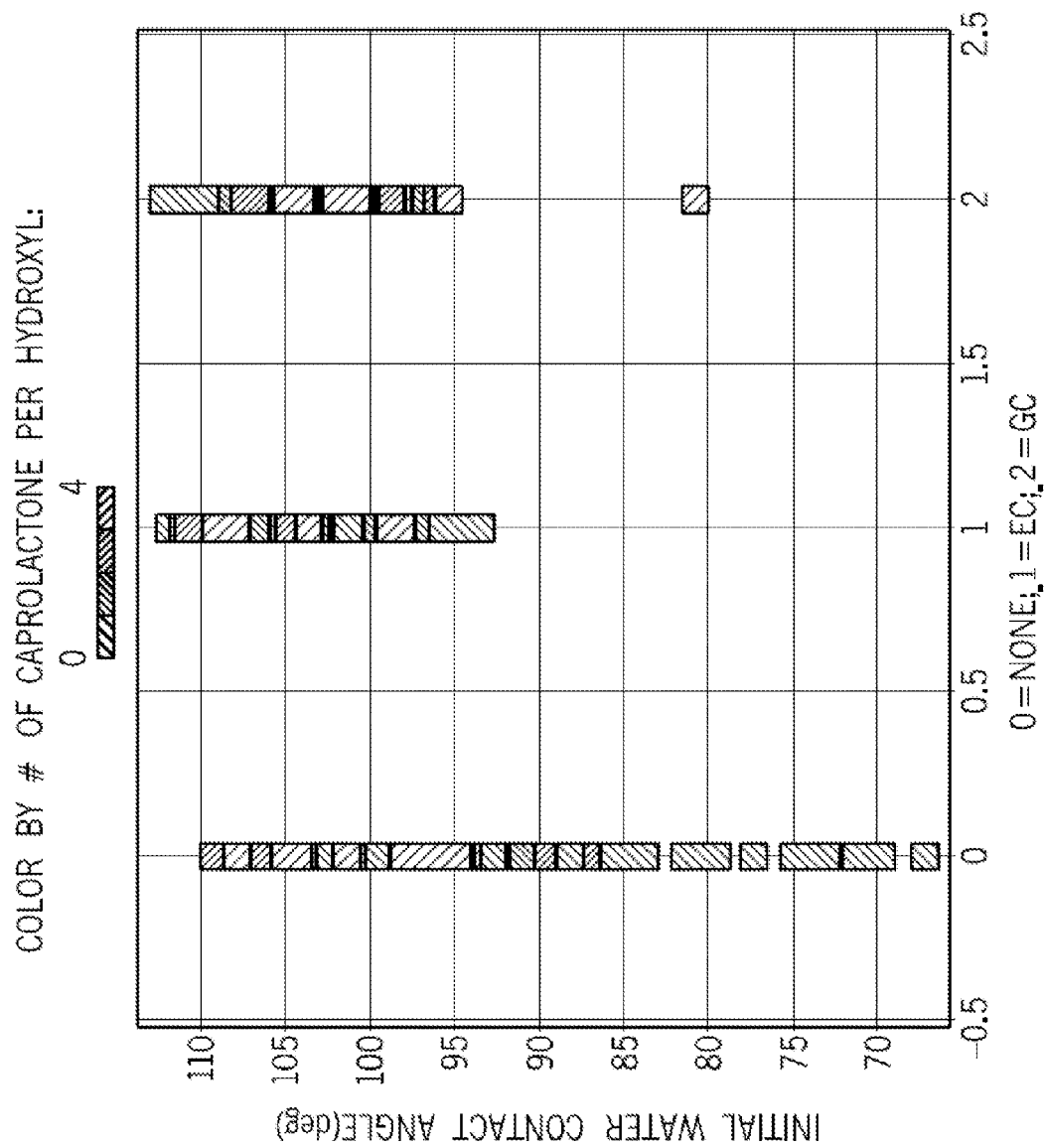
FIG. 5 shows a plot of water contact angle versus number of caprolactones per hydroxyl for panels coated with various polysiloxane-polyurethane materials following 30 days water immersion.

The initial WCA for the coatings using the conventional polymers is measured and compared to the initial WCA from the coatings prepared in Example 2. FIG. 5 shows a plot of the results of these measurements. The leftmost column shows the results of the coatings prepared using conventional polymers and the other two columns show the results of the coatings prepared using carbamate linkages (i.e., middle column shows the results of coatings using ethylene carbonate derived carbamate linkages and the rightmost column shows the results for coatings using glycerine carbonate derived carbamate linkages). As shown in FIG. 5, the use of a carbamate linkage results in coatings which are more reliably hydrophobic, which is a potential indication of usefulness as an anti-fouling material. The use of the carbamate linkage results in better control of the surface properties of the resulting polyurethane coatings. It should be noted that the color of each data point in FIGS. 5 and 6 represent the number of caprolactones per hydroxyl as shown in the legend.

Figure 6:
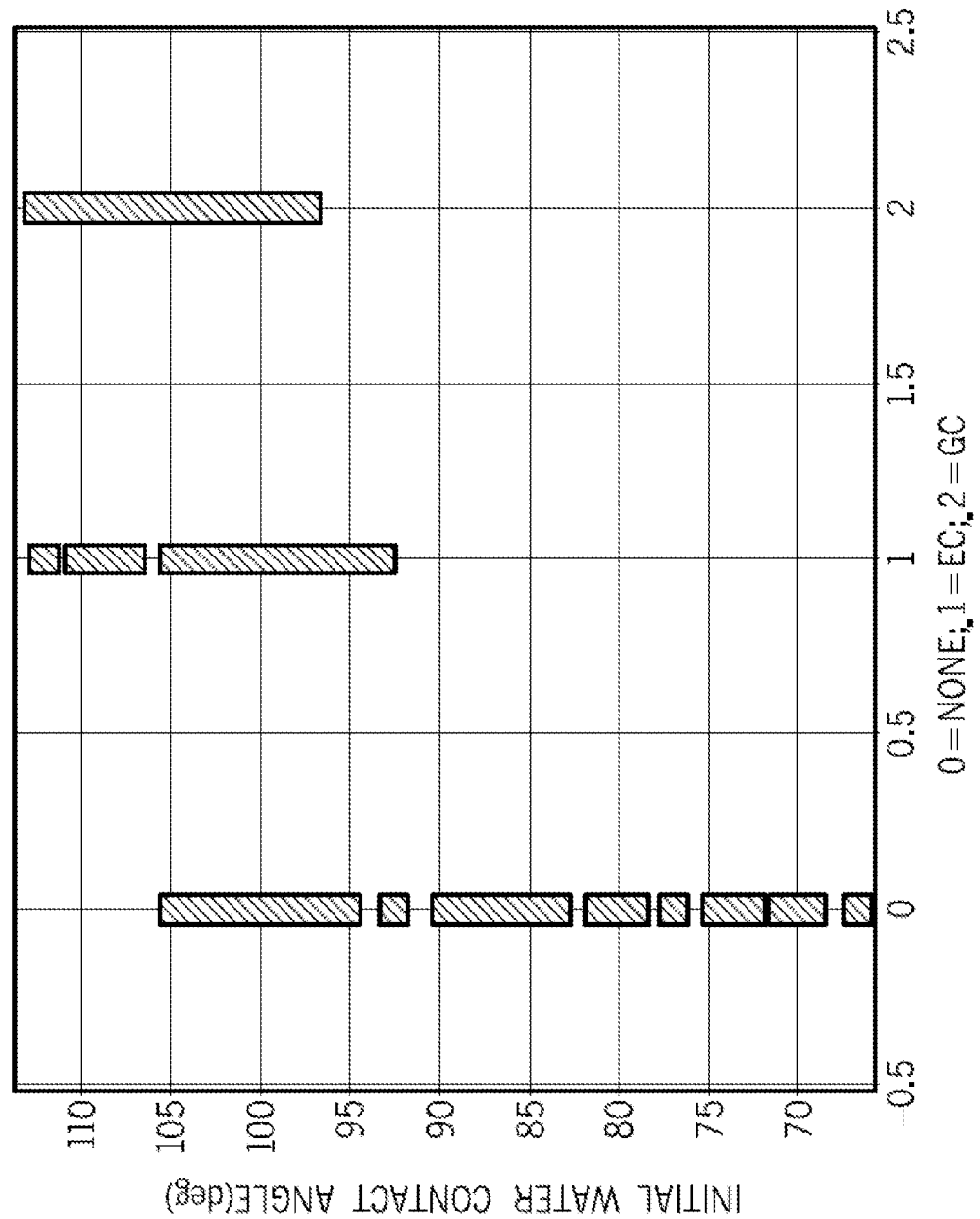
FIG. 6 shows a plot of initial water contact angle for panels coated with various materials prepared from polysiloxanes having carbamate linkages (based on EC or GC) in comparison to a group of conventional polysiloxane based polymers.

FIG. 6 shows a plot of the results of only those coatings (coatings using conventional polymers and coatings using polymers from Example 2) that did not have any caprolactone units. As shown in FIG. 6, the difference between the coatings prepared using carbamate linkages and the coating prepared using conventional polymers is even more pronounced.

Example 4

Illustrative Coating Formulation Example. Coating formulations are prepared from the siloxane polymer or block copolymer, a polycaprolactone triol (Tone Polyol 0305) and a polyisocyanate crosslinker. The ratio of isocyanate groups to hydroxyl groups is held constant at 1.1:1.0. A catalyst, dibutyl tin diacetate (DBTDAc), is used at a level of 0.075 wt. % based on total solid resin components. A pot life extender, 2,4-pentanedione, is also used to prevent premature gelation at a level of 10% (based on total solid resin components). Stock solutions of each of the resin components in solvent are prepared for ease of delivery using automated robotic pipets.

To prepare a polyurethane coating formulation containing 20% PDMS caprolactone triblock copolymer (B1-101108; see Tables 2, 4 and 5), using an automated formulation system, 695.17 µl siloxane polymer solution (30% in EEP, 200.00 mg siloxane), 276.03 µl Tone Polyol 0305 (90% in MAK, 254.14 mg polyol), and 104.49 µl 2,4-pentanedione were dispensed to the vials. After overnight mixing, 735.66 µl XIDT 70B isocyanate crosslinker (70% in BuAc, 545.86 mg isocyanate resin) and 92.02 µl catalyst DBTDAc (1% in MAK, 0.75 mg catalyst) were added to the vials and continued mixing until sufficient viscosity was obtained for coating application.

Illustrative Embodiments

The present polymer and coatings are further illustrated by the embodiments described below, which are not intended to limit the scope of the present invention.

One embodiment provides a polymer including at least one subunit derived from a polysiloxane terminated with one or more hydroxy functional carbamate groups. For example, the polymer may be formed by cross-linking a polymer having the formula:

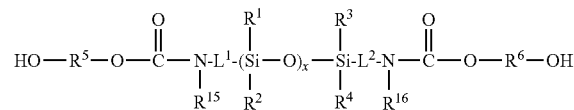

wherein x is such that the polymer has a molecular weight of about 1,000 to 100,000; e.g., with an isocyanate compound, optionally in the presence of a polyol. Quite commonly, the isocyanate functional compound comprises a polyisocyanate compound, such as a polyisocyanate compound which includes at least 3 isocyanate groups. The polyol compound suitably has a hydroxy equivalent weight of no more than about 500 and, very often, the polyol compound may have a hydroxy equivalent weight of no more than about 250.

In other embodiments, the hydroxy functional carbamate terminated polysiloxane may be reacted with a lactone, such as caprolactone.

The carbamate terminated polysiloxane may suitably be a polymer in which $R^1$, $R^2$, $R^3$, and $R^4$ may independently be hydrogen, $C_1$-$C_{10}$ alkyl, $C_1$-$C_{10}$ fluoro-substituted alkyl, cyclopentyl, cyclohexyl, benzyl, toluoyl, xylyl and/or phenyl;

$R^5$ and $R^6$ are linking groups;

$R^{15}$ and $R^{16}$ are independently hydrogen, $C_1$-$C_{10}$ alkyl, cyclopentyl, cyclohexyl, benzyl, toluoyl, xylyl or phenyl; and $L^1$ and $L^2$ are linking groups.

The polymer may suitably have x such that the polymer has a molecular weight of about 10,000 to 75,000 and, in some instances, a molecular weight of about 20,000 to 50,000.

In such embodiments, $R^5$ and $R^6$ are independently linear and/or branched alkylene; linear and/or branched hydroxysubstituted alkylene; linear and/or branched vinyl-substituted alkylene; or a combination thereof. In such embodiments, $R^5$ and $R^6$ may have from 2 to 10 carbon atoms and are commonly independently selected from $C_2$-$C_4$ alkylene and/or $C_2$-$C_4$ hydroxysubstituted alkylene. For example, $R^5$ and $R^6$ may be independently ethylene, propylene and/or hydroxypropylene (e.g., 2-hydroxymethylethylene).

Quite commonly, $L^1$ and $L^2$ are independently linear or branched alkylene; preferably having from 2 to 10 carbon atoms, e.g., $L^1$ and $L^2$ may independently be $C_2$-$C_6$ alkylene, such as an ethylene and/or propylene linker.

In one exemplary embodiment, $R^1$, $R^2$, $R^3$, and $R^4$ are methyl; and $R^{15}$ and $R^{16}$ are hydrogen. In such a polymer, $R^5$ and $R^6$ may suitably be ethylene. In another exemplary embodiment, $R^1$, $R^2$, $R^3$, and $R^4$ are methyl; $R^5$ and $R^6$ are ethylene; $L^1$ and $L^2$ are propylene; and $R^{15}$ and $R^{16}$ are hydrogen. In yet another, $R^1$, $R^2$, $R^3$, and $R^4$ are methyl; $R^5$ and $R^6$ are hydroxymethylethylene; $L^1$ and $L^2$ are propylene; and $R^{15}$ and $R^{16}$ are hydrogen.

In one embodiment, the polymer may include one or more subunits derived from a polysiloxane terminated with a hydroxyalkyl functional carbamate group. In others, the polymer may contain one or more subunits derived from a polysiloxane terminated with a hydroxy alkyl functional carbamate group. Such polymers may be formed by crosslinking the hydroxy functional polysiloxane using an isocyanate functional compound. The polymer may include a polyester subunit(s) and/or a polyurethane subunit(s).

The functionalized polysiloxanes described herein may be used to form coatings. Such coatings may have a water contact angle after immersion (e.g., in water for 30 days) of at least about 90°, desirably at least about 100°; and in some instances at least about 105°; more preferably at least about 110°. Such coatings may have a release force after water immersion for 30 days of no more than about 30 N; preferably no more than about 20 N; and, more preferably, no more than about 15 N.

One specific embodiment provides a polymer having the formula:

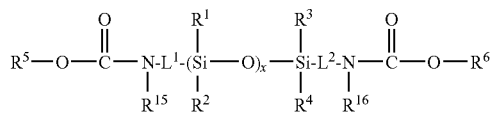

wherein x is such that the polymer has a molecular weight of about 1,000 to 100,000;

$R^1$, $R^2$, $R^3$, and $R^4$ are independently hydrogen, $C_1$-$C_{10}$ alkyl, $C_1$-$C_{10}$ fluoro-substituted alkyl, cyclopentyl, cyclohexyl, benzyl, toluoyl, xylyl and/or phenyl;

$R^5$ and $R^6$ are independently a hydroxy-substituted terminal group;

$R^{15}$ and $R^{16}$ are independently hydrogen, $C_1$-$C_{10}$ alkyl, cyclopentyl, cyclohexyl, benzyl, toluoyl, xylyl and/or phenyl; and $L^1$ and $L^2$ are linking groups.

In such a polymer x is suitably such that the polymer has a molecular weight of about 10,000 to 75,000 and, more desirably, a molecular weight of about 20,000 to 50,000. $L^1$ and $L^2$ are independently linear or branched alkylene, such as $C_2$-$C_6$ alkylene.

$R^5$ may suitably have the formula

and $R^6$ the formula

wherein $R^7$ and $R^8$ are independently linear and/or branched alkylene; linear and/or branched hydroxy-substituted alkylene; linear and/or branched vinyl-substituted alkylene; or a combination thereof.

In other embodiments, $R^5$ may have the formula

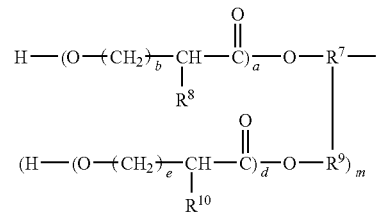

and $R^6$ the formula

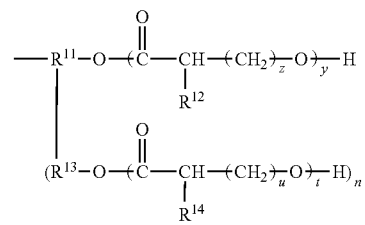

wherein $R^7$, $R^9$, $R^{11}$, and $R^{13}$ are independently linear and/or branched alkylene;

$R^8$, $R^{10}$, $R^{12}$, and $R^{14}$ are independently hydrogen or linear and/or branched $C_1$-$C_{10}$ alkyl;

b, e, z, and u are independently an integer from 0 to 6;

a, d, y, and t are independently an integer from 1 to 300; and m and n are independently 0 or 1.

For example, b, e, z, and u may be 4; where $R^8$, $R^{10}$, $R^{12}$, and $R^{14}$ are hydrogen; $R^7$ and $R^{11}$ are —($CH_2$)—CH—; $R^9$ and $R^{13}$ are —$CH_2$—; a, d, y, and t are independently an integer from 1 to 10; and m and n are 1. Suitably, a, d, y, and t may independently be 1 to 2.

For instance, b, e, z, and u may be 4; $R^8$, $R^{10}$, $R^{12}$, and $R^{14}$ are hydrogen; $R^7$ and $R^{11}$ are —($CH_2$)$_2$—; a and y are independently an integer from 1 to 10; and m and n are 0. For example, a and y may independently be 1 or 2.

The cross-linked polysiloxanes described herein may be formed via reaction with an isocyanate functional compound which comprises isophorone diisocyanate based polyisocyanate and/or a hexane diisocyanate based polyisocyanate. For example, the isophorone diisocyanate-based polyisocyanate may be isophorone diisocyanate-based polyisocyanate having an isocyanate equivalent weight of about 200 to 500. The diisocyanate-based polyisocyanate may be a hexane diisocyanate-based polyisocyanate having an isocyanate equivalent weight of about 150 to 300.

In other embodiments. the isocyanate functional compound may comprise hexamethylene diisocyanate, isophorone diisocyanate, diphenylmethane diisocyanate and/or toluene diisocyanate.

Coating compositions which include the functionalized polysiloxanes described herein may commonly also include a solvent component. The coating compositions may also include a polyol, e.g., a polyol which has at least 3 hydroxy groups. The present coating compositions may include about 5 to 50 wt. % on a total solids basis of the polymer described above. Such coating compositions may be used to form a polymeric coating, e.g., by applying the described coating compositions on at least one surface of an article; and removing solvent component from the coated surface.

Other embodiments provide a polysiloxane terminated with hydroxyalkyl carbamate groups, such as a polysiloxane wherein the hydroxyalkyl carbamate groups include dihydroxy branched alkyl carbamate groups. The hydroxyalkyl carbamate groups may include vinyl substituted hydroxyalkyl carbamate groups.

The polysiloxanes described herein may suitably have a molecular weight ($M_n$) of about 10,000 to 75,000. Such polysiloxanes may include a polydimethyl siloxane terminated with hydroxyalkyl carbamate groups, wherein the hydroxyalkyl carbamate groups include hydroxyethyl carbamate groups, hydroxypropyl carbamate groups and/or dihydroxypropyl carbamate groups.

The terms recited in the claims should be given their ordinary and customary meaning as determined by reference to relevant entries (e.g., definition of "plane" as a carpenter's tool would not be relevant to the use of the term "plane" when used to refer to an airplane, etc.) in dictionaries (e.g., common use and/or technical dictionaries), commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used herein in a manner more expansive than its ordinary and customary meaning, the term should be given its ordinary and customary meaning plus the additional expansive meaning, or (b) if a term has been explicitly defined to have a different meaning by reciting the term followed by the phase "as used herein shall mean" or similar language (e.g., "herein this term means," "as defined herein," "for the purposes of this disclosure [the term] shall mean," etc.). References to specific examples, use of "i.e.," use of the word "invention," etc., are not meant to invoke exception (b) or otherwise restrict the scope of the recited claim terms. Accordingly, the subject matter recited in the claims is not coextensive with and should not be interpreted to be coextensive with any particular embodiment, feature, or combination of features other than those explicitly recited in the claims, even if only a single embodiment of the particular feature or combination of features is illustrated and described herein. Thus, the appended claims should be read to be given their broadest interpretation in view of the prior art and the ordinary meaning of the claim terms.

As used herein, spatial or directional terms, such as "left," "right," "front," "back," and the like, relate to the subject matter as it is shown in the drawing FIGS. However, it is to be understood that the subject matter described herein may assume various alternative orientations and, accordingly, such terms are not to be considered as limiting. Furthermore, as used herein (i.e., in the claims and the specification), articles such as "the," "a," and "an" can connote the singular or plural. Also, as used herein, the word "or" when used without a preceding "either" (or other similar language indicating that "or" is unequivocally meant to be exclusive—e.g., only one of x or y, etc.) shall be interpreted to be inclusive (e.g., "x or y" means one or both x or y). Likewise, as used herein, the term "and/or" shall also be interpreted to be inclusive (e.g., "x and/or y" means one or both x or y). In situations where "and/or" or "or" are used as a conjunction for a group of three or more items, the group should be interpreted to include one item alone, all of the items together, or any combination or number of the items. Moreover, terms used in the specification and claims such as have, having, include, and including should be construed to be synonymous with the terms comprise and comprising.

Unless otherwise indicated, all numbers or expressions, such as those expressing dimensions, physical characteristics, etc. used in the specification are understood as modified in all instances by the term "about." At the very least, and not as an attempt to limit the application of the doctrine of equivalents to the claims, each numerical parameter recited in the specification or claims which is modified by the term "about" should at least be construed in light of the number of recited significant digits and by applying ordinary rounding techniques. Moreover, all ranges disclosed herein are to be understood to encompass any and all subranges subsumed therein. For example, a stated range of 1 to 10 should be considered to include any and all subranges between and inclusive of the minimum value of 1 and the maximum value of 10; that is, all subranges beginning with a minimum value of 1 or more and ending with a maximum value of 10 or less (e.g., 5.5 to 10).

TABLE 4

| Coating ID | Target PDMS Mn (g/mole) | % Oligomer added | % actual PDMS added | EC = 0; GC = 1 | Number of Caprolactone per Hydroxyl | Initial Water Contact Angle (deg) | Initial Average Force at Release (N) | Water Contact Angle after water immersion (deg) | Average Force at Release after water immersion (N) | Change in Water Contact Angle (deg) | Change in Force at Release (N) |
|---|---|---|---|---|---|---|---|---|---|---|---|
| A1-101046 | 2500 | 10 | 9.3 | 0 | 0 | 93.4 | 16.2 | 93.2 | 12.9 | −0.2 | −3.3 |
| A2-101046 | 2500 | 10 | 9.1 | 1 | 0 | 97.5 | 14.8 | 97.5 | 22.4 | 0.0 | |
| A3-101046 | 5000 | 10 | 9.7 | 0 | 0 | 97.1 | 13.7 | 96.5 | 17.5 | −0.6 | 3.8 |
| A4-101046 | 5000 | 10 | 9.5 | 1 | 0 | 98.1 | 18.2 | 97.0 | 20.7 | −1.1 | 2.5 |
| A5-101046 | 7500 | 10 | 9.8 | 0 | 0 | 97.9 | 20.8 | 96.0 | 13.6 | −1.9 | −7.1 |
| A6-101046 | 7500 | 10 | 9.7 | 1 | 0 | 98.6 | 16.1 | 98.5 | 20.0 | −0.1 | 3.9 |

TABLE 4-continued

| Coating ID | Target PDMS Mn (g/mole) | % Oligomer added | % actual PDMS added | EC = 0; GC = 1 | Number of Caprolactone per Hydroxyl | Initial Water Contact Angle (deg) | Initial Average Force at Release (N) | Water Contact Angle after water immersion (deg) | Average Force at Release after water immersion (N) | Change in Water Contact Angle (deg) | Change in Force at Release (N) |
|---|---|---|---|---|---|---|---|---|---|---|---|
| B1-101046 | 2500 | 10 | 8.0 | 0 | 2 | 97.4 | 15.2 | 90.5 | 12.9 | −6.9 | −2.3 |
| B2-101046 | 2500 | 10 | 6.9 | 1 | 2 | 98.2 | 14.6 | 91.4 | 9.9 | −6.8 | −4.8 |
| B3-101046 | 5000 | 10 | 8.9 | 0 | 2 | 98.3 | 11.5 | 96.7 | 10.6 | −1.6 | −0.9 |
| B4-101046 | 5000 | 10 | 8.1 | 1 | 2 | 98.1 | 12.1 | 96.0 | 17.1 | −2.1 | 4.9 |
| B5-101046 | 7500 | 10 | 9.2 | 0 | 2 | 97.2 | 14.5 | 96.8 | 13.5 | −0.4 | −1.0 |
| B6-101046 | 7500 | 10 | 8.7 | 1 | 2 | 97.0 | 15.9 | 95.0 | 9.4 | −2.0 | −6.6 |
| C1-101046 | 2500 | 10 | 7.4 | 0 | 3 | 98.3 | 13.0 | 88.8 | 13.6 | −9.5 | 0.7 |
| C2-101046 | 2500 | 10 | 6.1 | 1 | 3 | 98.3 | 17.9 | 82.3 | 12.0 | −16.0 | −5.9 |
| C3-101046 | 5000 | 10 | 8.5 | 0 | 3 | 96.9 | 17.4 | 95.5 | 11.0 | −1.4 | −6.5 |
| C4-101046 | 5000 | 10 | 7.6 | 1 | 3 | 98.4 | 9.1 | 96.0 | 10.1 | −2.4 | 1.0 |
| C5-101046 | 7500 | 10 | 9.0 | 0 | 3 | 98.3 | 16.4 | 95.7 | 17.0 | −2.6 | 0.6 |
| C6-101046 | 7500 | 10 | 8.2 | 1 | 3 | 97.4 | 8.7 | 95.0 | 15.7 | −2.4 | 7.0 |
| D1-101046 | 2500 | 10 | 7.0 | 0 | 4 | 97.1 | 17.9 | — | 19.3 | — | 1.4 |
| D2-101046 | 2500 | 10 | 5.5 | 1 | 4 | 98.2 | 14.9 | 87.7 | 11.3 | −10.5 | −3.7 |
| D3-101046 | 5000 | 10 | 8.2 | 0 | 4 | 97.6 | 18.7 | 93.5 | 9.0 | −4.1 | −9.7 |
| D4-101046 | 5000 | 10 | 7.1 | 1 | 4 | 100.7 | 13.0 | 95.6 | 14.3 | −5.1 | 1.3 |
| D5-101046 | 7500 | 10 | 8.7 | 0 | 4 | 97.8 | 13.5 | 94.5 | 9.3 | −3.3 | −4.3 |
| D6-101046 | 7500 | 10 | 7.8 | 1 | 4 | 97.7 | 19.7 | 97.9 | 12.2 | 0.2 | −7.5 |
| A1-101047 | 2500 | 20 | 18.7 | 0 | 0 | 94.6 | 20.7 | 95.0 | 19.8 | 0.4 | −0.8 |
| A2-101047 | 2500 | 20 | 18.3 | 1 | 0 | 99.4 | 24.0 | 99.2 | 21.2 | −0.2 | −2.8 |
| A3-101047 | 5000 | 20 | 19.3 | 0 | 0 | 100.0 | 22.3 | 99.6 | 24.6 | −0.4 | 2.3 |
| A4-101047 | 5000 | 20 | 19.1 | 1 | 0 | 100.1 | 18.7 | 99.7 | 21.3 | −0.4 | 2.6 |
| A5-101047 | 7500 | 20 | 19.5 | 0 | 0 | 100.6 | 24.3 | 99.3 | 27.2 | −1.3 | 2.9 |
| A6-101047 | 7500 | 20 | 19.4 | 1 | 0 | 100.4 | 20.9 | 100.7 | 23.4 | 0.3 | 2.5 |
| B1-101047 | 2500 | 20 | 16.0 | 0 | 2 | 98.4 | 10.5 | 93.6 | 16.8 | −4.8 | 6.3 |
| B2-101047 | 2500 | 20 | 13.7 | 1 | 2 | 99.0 | 15.3 | 93.6 | 15.3 | −5.4 | −0.1 |
| B3-101047 | 5000 | 20 | 17.8 | 0 | 2 | 100.4 | 28.3 | 97.5 | 20.1 | −2.9 | −8.2 |
| B4-101047 | 5000 | 20 | 16.3 | 1 | 2 | 100.0 | 15.9 | 97.7 | 17.1 | −2.3 | 1.3 |
| B5-101047 | 7500 | 20 | 18.4 | 0 | 2 | 99.8 | 23.7 | 99.3 | 25.1 | −0.5 | 1.4 |
| B6-101047 | 7500 | 20 | 17.3 | 1 | 2 | 98.7 | 20.1 | 97.3 | 27.0 | −1.4 | 6.9 |
| C1-101047 | 2500 | 20 | 14.9 | 0 | 3 | 98.5 | 17.3 | 92.2 | 19.7 | −6.3 | 2.3 |
| C2-101047 | 2500 | 20 | 12.2 | 1 | 3 | 97.6 | 18.5 | 94.6 | 15.2 | −3.0 | −3.3 |
| C3-101047 | 5000 | 20 | 17.1 | 0 | 3 | 98.6 | 22.5 | 96.1 | 19.0 | −2.5 | −3.4 |
| C4-101047 | 5000 | 20 | 15.1 | 1 | 3 | 99.3 | 11.9 | 99.0 | 10.9 | −0.3 | −1.0 |
| C5-101047 | 7500 | 20 | 17.9 | 0 | 3 | 99.6 | 16.2 | 97.1 | 9.1 | −2.5 | −7.1 |
| C6-101047 | 7500 | 20 | 16.5 | 1 | 3 | 98.2 | 23.9 | 97.2 | 20.7 | −1.0 | −3.2 |

TABLE 4-continued

| Coating ID | Target PDMS Mn (g/mole) | % Oligomer added | % actual PDMS added | EC = 0; GC = 1 | Number of Caprolactone per Hydroxyl | Initial Water Contact Angle (deg) | Initial Average Force at Release (N) | Water Contact Angle after water immersion (deg) | Average Force at Release after water immersion (N) | Change in Water Contact Angle (deg) | Change in Force at Release (N) |
|---|---|---|---|---|---|---|---|---|---|---|---|
| D1-101047 | 2500 | 20 | 13.9 | 0 | 4 | 97.4 | 24.3 | 97.8 | 17.9 | 0.4 | −6.4 |
| D2-101047 | 2500 | 20 | 11.0 | 1 | 4 | 99.6 | 22.5 | 96.1 | 13.9 | −3.5 | −8.7 |
| D3-101047 | 5000 | 20 | 16.4 | 0 | 4 | 98.4 | 16.8 | 97.2 | 12.3 | −1.2 | −4.5 |
| D4-101047 | 5000 | 20 | 14.2 | 1 | 4 | 97.2 | 18.5 | 100.4 | 14.4 | 3.2 | −4.1 |
| D5-101047 | 7500 | 20 | 17.5 | 0 | 4 | 98.4 | 12.5 | 101.1 | 12.0 | 2.7 | −0.5 |
| D6-101047 | 7500 | 20 | 15.7 | 1 | 4 | 80.8 | 21.5 | 101.7 | 22.1 | 20.9 | 0.7 |
| A1-101048 | 2500 | 30 | 28.0 | 0 | 0 | 95.9 | 18.3 | 96.1 | 22.9 | 0.2 | 4.6 |
| A2-101048 | 2500 | 30 | 27.4 | 1 | 0 | 100.5 | 17.4 | 98.0 | 20.1 | −2.5 | 2.7 |
| A3-101048 | 5000 | 30 | 29.0 | 0 | 0 | 100.3 | 23.6 | 97.7 | 31.0 | −2.6 | 7.4 |
| A4-101048 | 5000 | 30 | 28.6 | 1 | 0 | 101.4 | 19.9 | 99.9 | 24.9 | −1.5 | 5.1 |
| A5-101048 | 7500 | 30 | 29.3 | 0 | 0 | 101.2 | 27.5 | 99.6 | 29.7 | −1.6 | 2.2 |
| A6-101048 | 7500 | 30 | 29.1 | 1 | 0 | 102.4 | 27.2 | 100.5 | 20.6 | −1.9 | −6.7 |
| B1-101048 | 2500 | 30 | 23.9 | 0 | 2 | 99.3 | 12.5 | 90.8 | 19.1 | −8.5 | 6.5 |
| B2-101048 | 2500 | 30 | 20.6 | 1 | 2 | 98.5 | 16.6 | 92.2 | 11.9 | −6.3 | −4.7 |
| B3-101048 | 5000 | 30 | 26.6 | 0 | 2 | 101.7 | 29.9 | 98.7 | 24.6 | −3.0 | −5.3 |
| B4-101048 | 5000 | 30 | 24.4 | 1 | 2 | 100.9 | 18.9 | 99.1 | 20.0 | −1.8 | 1.1 |
| B5-101048 | 7500 | 30 | 27.7 | 0 | 2 | 101.6 | 22.3 | 99.5 | 32.4 | −2.1 | 10.1 |
| B6-101048 | 7500 | 30 | 26.0 | 1 | 2 | 100.9 | 29.1 | 99.8 | 25.3 | −1.1 | −3.9 |
| C1-101048 | 2500 | 30 | 22.3 | 0 | 3 | 99.1 | 14.2 | 92.2 | 20.8 | −6.9 | 6.6 |
| C2-101048 | 2500 | 30 | 18.3 | 1 | 3 | 98.4 | 19.4 | 93.9 | 9.7 | −4.5 | −9.8 |
| C3-101048 | 5000 | 30 | 25.6 | 0 | 3 | 98.9 | 25.3 | 97.4 | 20.5 | −1.5 | −4.8 |
| C4-101048 | 5000 | 30 | 22.7 | 1 | 3 | 98.9 | 16.5 | 97.3 | 18.3 | −1.6 | 1.9 |
| C5-101048 | 7500 | 30 | 26.9 | 0 | 3 | 100.3 | 15.7 | 98.2 | 13.7 | −2.1 | −2.0 |
| C6-101048 | 7500 | 30 | 24.7 | 1 | 3 | 98.2 | 21.8 | 97.9 | 18.6 | −0.3 | −3.2 |
| D1-101048 | 2500 | 30 | 20.9 | 0 | 4 | 97.9 | 22.7 | 90.7 | 23.1 | −7.2 | 0.4 |
| D2-101048 | 2500 | 30 | 16.4 | 1 | 4 | 98.2 | 22.5 | 89.5 | 16.9 | −8.7 | −5.6 |
| D3-101048 | 5000 | 30 | 24.6 | 0 | 4 | 97.2 | 19.6 | 96.0 | 24.3 | −1.2 | 4.7 |
| D4-101048 | 5000 | 30 | 21.2 | 1 | 4 | 98.3 | 11.1 | 95.6 | 15.7 | −2.7 | 4.6 |
| D5-101048 | 7500 | 30 | 26.2 | 0 | 4 | 99.9 | 11.8 | 98.1 | 20.2 | −1.8 | 8.4 |
| D6-101048 | 7500 | 30 | 23.5 | 1 | 4 | 98.9 | 18.1 | 97.4 | 15.0 | −1.5 | −3.1 |
| A1-101049 | 2500 | 40 | 37.4 | 0 | 0 | 97.8 | 24.4 | 96.5 | 23.0 | −1.3 | −1.4 |
| A2-101049 | 2500 | 40 | 36.5 | 1 | 0 | 100.9 | 24.3 | 99.8 | 19.9 | −1.1 | −4.4 |
| A3-101049 | 5000 | 40 | 38.6 | 0 | 0 | 102.5 | 31.2 | 101.5 | 41.9 | −1.0 | 10.7 |
| A4-101049 | 5000 | 40 | 38.2 | 1 | 0 | 101.2 | 19.6 | 99.9 | 25.0 | −1.3 | 5.4 |
| A5-101049 | 7500 | 40 | 39.1 | 0 | 0 | 99.7 | 25.3 | 101.2 | 43.8 | 1.5 | 18.4 |
| A6-101049 | 7500 | 40 | 38.8 | 1 | 0 | 102.7 | 28.4 | 103.0 | 30.6 | 0.3 | 2.2 |

TABLE 4-continued

| Coating ID | Target PDMS Mn (g/mole) | % Oligomer added | % actual PDMS added | EC = 0; GC = 1 | Number of Caprolactone per Hydroxyl | Initial Water Contact Angle (deg) | Initial Average Force at Release (N) | Water Contact Angle after water immersion (deg) | Average Force at Release after water immersion (N) | Change in Water Contact Angle (deg) | Change in Force at Release (N) |
|---|---|---|---|---|---|---|---|---|---|---|---|
| B1-101049 | 2500 | 40 | 31.9 | 0 | 2 | 97.2 | 30.2 | 91.1 | 28.0 | −6.1 | −2.2 |
| B2-101049 | 2500 | 40 | 27.4 | 1 | 2 | 98.0 | 21.6 | 97.2 | 20.1 | −0.8 | −1.6 |
| B3-101049 | 5000 | 40 | 35.5 | 0 | 2 | 103.8 | 23.6 | 102.3 | 30.8 | −1.5 | 7.2 |
| B4-101049 | 5000 | 40 | 32.5 | 1 | 2 | 100.8 | 21.4 | 100.4 | 27.0 | −0.4 | 5.6 |
| B5-101049 | 7500 | 40 | 36.9 | 0 | 2 | 102.4 | 24.1 | 103.4 | 46.0 | 1.0 | 21.9 |
| B6-101049 | 7500 | 40 | 34.7 | 1 | 2 | 103.8 | 23.1 | 105.4 | 23.8 | 1.6 | 0.6 |
| C1-101049 | 2500 | 40 | 29.8 | 0 | 3 | 99.7 | 26.8 | 93.2 | 33.6 | −6.5 | 6.9 |
| C2-101049 | 2500 | 40 | 24.4 | 1 | 3 | 99.4 | 20.3 | 95.7 | 9.0 | −3.7 | −11.3 |
| C3-101049 | 5000 | 40 | 34.1 | 0 | 3 | 103.2 | 32.0 | 101.5 | 38.0 | −1.7 | 6.0 |
| C4-101049 | 5000 | 40 | 30.3 | 1 | 3 | 100.4 | 19.6 | 100.2 | 32.4 | −0.2 | 12.8 |
| C5-101049 | 7500 | 40 | 35.9 | 0 | 3 | 101.4 | 32.7 | 102.4 | 30.8 | 1.0 | −1.9 |
| C6-101049 | 7500 | 40 | 32.9 | 1 | 3 | 101.5 | 25.6 | 105.2 | 39.1 | 3.7 | 13.5 |
| D1-101049 | 2500 | 40 | 27.9 | 0 | 4 | 94.5 | 24.2 | 93.9 | 31.4 | −0.6 | 7.2 |
| D2-101049 | 2500 | 40 | 21.9 | 1 | 4 | 97.1 | 19.4 | 91.6 | 20.7 | −5.5 | 1.3 |
| D3-101049 | 5000 | 40 | 32.8 | 0 | 4 | 99.8 | 39.1 | 97.5 | 26.6 | −2.3 | −12.5 |
| D4-101049 | 5000 | 40 | 28.3 | 1 | 4 | 101.0 | 31.2 | 96.3 | 35.1 | −4.7 | 3.9 |
| D5-101049 | 7500 | 40 | 34.9 | 0 | 4 | 99.7 | 25.7 | 100.5 | 28.4 | 0.8 | 2.7 |
| D6-101049 | 7500 | 40 | 31.4 | 1 | 4 | 100.5 | — | 96.4 | 26.8 | −4.1 | — |
| A1-101107 | 10000 | 10 | 9.8 | 0 | 0 | 98.6 | 11.1 | 100.0 | 20.1 | 1.4 | 9.0 |
| A2-101107 | 15000 | 10 | 9.9 | 0 | 0 | 99.2 | 9.8 | — | — | — | — |
| A3-101107 | 20000 | 10 | 9.9 | 0 | 0 | 95.7 | 9.8 | — | — | — | — |
| A4-101107 | 25000 | 10 | 9.9 | 0 | 0 | 104.7 | 10.8 | 101.4 | 8.9 | −3.3 | −1.9 |
| A5-101107 | 30000 | 10 | 9.9 | 0 | 0 | 107.6 | 9.2 | — | — | — | — |
| A6-101107 | 35000 | 10 | 9.9 | 0 | 0 | 107.1 | 9.0 | — | — | — | — |
| B1-101107 | 10000 | 10 | 9.4 | 0 | 2 | 103.8 | 19.5 | 102.5 | 11.9 | −1.3 | −7.6 |
| B2-101107 | 15000 | 10 | 9.6 | 0 | 2 | 107.7 | 17.3 | — | — | — | — |
| B3-101107 | 20000 | 10 | 9.7 | 0 | 2 | 109.1 | 20.8 | — | — | — | — |
| B4-101107 | 25000 | 10 | 9.8 | 0 | 2 | 109.0 | 17.9 | 108.5 | 14.9 | −0.5 | −3.0 |
| B5-101107 | 30000 | 10 | 9.8 | 0 | 2 | 109.8 | 22.7 | 109.2 | 13.8 | −0.6 | −9.0 |
| B6-101107 | 35000 | 10 | 9.8 | 0 | 2 | 108.9 | 21.0 | — | — | — | — |
| C1-101107 | 10000 | 10 | 9.2 | 0 | 3 | 99.9 | 10.3 | 99.1 | 11.9 | −0.8 | 1.5 |
| C2-101107 | 15000 | 10 | 9.5 | 0 | 3 | 106.8 | 22.3 | 103.1 | 16.2 | −3.7 | −6.1 |
| C3-101107 | 20000 | 10 | 9.6 | 0 | 3 | 108.4 | 22.4 | — | — | — | — |
| C4-101107 | 25000 | 10 | 9.7 | 0 | 3 | 109.1 | 23.5 | 107.3 | 19.6 | −1.8 | −3.8 |
| C5-101107 | 30000 | 10 | 9.7 | 0 | 3 | 108.7 | 20.0 | 106.5 | 17.5 | −2.2 | −2.5 |
| C6-101107 | 35000 | 10 | 9.8 | 0 | 3 | 107.8 | 31.7 | — | — | — | — |

TABLE 4-continued

| Coating ID | Target PDMS Mn (g/mole) | % Oligomer added | % actual PDMS added | EC = 0; GC = 1 | Number of Caprolactone per Hydroxyl | Initial Water Contact Angle (deg) | Initial Average Force at Release (N) | Water Contact Angle after water immersion (deg) | Average Force at Release after water immersion (N) | Change in Water Contact Angle (deg) | Change in Force at Release (N) |
|---|---|---|---|---|---|---|---|---|---|---|---|
| D1-101107 | 10000 | 10 | 9.0 | 0 | 4 | 99.7 | 17.8 | 97.7 | 13.1 | −2.0 | −4.7 |
| D2-101107 | 15000 | 10 | 9.3 | 0 | 4 | 104.5 | 23.2 | 101.3 | 21.2 | −3.2 | −2.0 |
| D3-101107 | 20000 | 10 | 9.5 | 0 | 4 | 106.3 | 22.4 | — | — | — | — |
| D4-101107 | 25000 | 10 | 9.6 | 0 | 4 | 107.1 | 35.5 | — | — | — | — |
| D5-101107 | 30000 | 10 | 9.6 | 0 | 4 | 105.6 | 26.1 | — | — | — | — |
| D6-101107 | 35000 | 10 | 9.7 | 0 | 4 | 106.1 | 25.8 | — | — | — | — |
| A1-101108 | 10000 | 20 | 19.7 | 0 | 0 | 98.2 | 9.5 | 101.1 | 12.1 | 2.9 | 2.6 |
| A2-101108 | 15000 | 20 | 19.8 | 0 | 0 | 102.9 | 9.4 | 102.3 | 8.9 | −0.6 | −0.5 |
| A3-101108 | 20000 | 20 | 19.8 | 0 | 0 | 94.8 | 9.5 | 96.6 | 8.6 | 1.8 | −0.9 |
| A4-101108 | 25000 | 20 | 19.9 | 0 | 0 | 103.5 | 10.1 | 103.5 | 8.5 | 0.0 | −1.5 |
| A5-101108 | 30000 | 20 | 19.9 | 0 | 0 | 107.2 | 8.9 | 106.5 | 8.7 | −0.7 | −0.2 |
| A6-101108 | 35000 | 20 | 19.9 | 0 | 0 | 104.1 | 8.8 | 105.7 | 8.6 | 1.6 | −0.2 |
| B1-101108 | 10000 | 20 | 18.8 | 0 | 2 | 100.4 | 22.9 | 101.2 | 18.5 | 0.8 | −4.4 |
| B2-101108 | 15000 | 20 | 19.2 | 0 | 2 | 106.2 | 24.6 | 103.9 | 18.7 | −2.3 | −5.9 |
| B3-101108 | 20000 | 20 | 19.4 | 0 | 2 | 109.3 | 31.3 | 106.0 | 12.2 | −3.3 | −19.1 |
| B4-101108 | 25000 | 20 | 19.5 | 0 | 2 | 108.4 | 21.2 | 107.9 | 17.4 | −0.5 | −3.8 |
| B5-101108 | 30000 | 20 | 19.6 | 0 | 2 | 108.4 | 25.2 | 108.8 | 19.1 | 0.4 | −6.1 |
| B6-101108 | 35000 | 20 | 19.6 | 0 | 2 | 106.9 | 28.6 | 108.7 | 10.1 | 1.8 | −18.5 |
| C1-101108 | 10000 | 20 | 18.4 | 0 | 3 | 98.4 | 25.4 | 95.8 | 13.8 | −2.6 | −11.6 |
| C2-101108 | 15000 | 20 | 18.9 | 0 | 3 | 105.2 | 25.3 | 102.9 | 19.6 | −2.3 | −5.7 |
| C3-101108 | 20000 | 20 | 19.2 | 0 | 3 | 107.5 | 29.6 | 105.8 | 23.0 | −1.7 | −6.6 |
| C4-101108 | 25000 | 20 | 19.3 | 0 | 3 | 108.6 | 21.6 | 108.0 | 17.8 | −0.6 | −3.8 |
| C5-101108 | 30000 | 20 | 19.4 | 0 | 3 | 107.9 | 22.1 | 107.9 | 17.2 | 0.0 | −4.9 |
| C6-101108 | 35000 | 20 | 19.5 | 0 | 3 | 107.7 | 24.7 | 107.6 | 14.1 | −0.1 | −10.6 |
| D1-101108 | 10000 | 20 | 18.0 | 0 | 4 | 98.1 | 12.6 | 101.3 | 12.9 | 3.2 | 0.3 |
| D2-101108 | 15000 | 20 | 18.6 | 0 | 4 | 103.3 | 20.0 | 103.1 | 19.4 | −0.2 | −0.6 |
| D3-101108 | 20000 | 20 | 19.0 | 0 | 4 | 105.3 | 23.5 | 103.0 | 25.7 | −2.3 | 2.3 |
| D4-101108 | 25000 | 20 | 19.2 | 0 | 4 | 105.9 | 22.6 | 105.5 | 14.5 | −0.4 | −8.2 |
| D5-101108 | 30000 | 20 | 19.3 | 0 | 4 | 106.5 | 20.8 | 105.3 | 21.2 | −1.2 | 0.4 |
| D6-101108 | 35000 | 20 | 19.4 | 0 | 4 | 106.8 | 35.7 | 106.4 | 19.5 | −0.4 | −16.3 |
| A1-101109 | 10000 | 30 | 29.5 | 0 | 0 | 103.1 | 11.7 | 103.2 | 15.0 | 0.1 | 3.4 |
| A2-101109 | 15000 | 30 | 29.7 | 0 | 0 | 107.2 | 15.1 | 104.3 | 13.9 | −2.9 | −1.1 |
| A3-101109 | 20000 | 30 | 29.7 | 0 | 0 | 109.6 | 10.2 | 108.0 | 10.4 | −1.6 | 0.2 |
| A4-101109 | 25000 | 30 | 29.8 | 0 | 0 | 108.3 | 16.7 | 106.8 | 14.8 | −1.5 | −1.9 |
| A5-101109 | 30000 | 30 | 29.8 | 0 | 0 | 109.6 | 10.9 | 108.5 | 9.2 | −1.1 | −1.7 |
| A6-101109 | 35000 | 30 | 29.8 | 0 | 0 | 109.4 | 9.9 | 107.4 | 8.7 | −2.0 | −1.1 |

TABLE 4-continued

| Coating ID | Target PDMS Mn (g/mole) | % Oligomer added | % actual PDMS added | EC = 0; GC = 1 | Number of Caprolactone per Hydroxyl | Initial Water Contact Angle (deg) | Initial Average Force at Release (N) | Water Contact Angle after water immersion (deg) | Average Force at Release after water immersion (N) | Change in Water Contact Angle (deg) | Change in Force at Release (N) |
|---|---|---|---|---|---|---|---|---|---|---|---|
| B1-101109 | 10000 | 30 | 28.2 | 0 | 2 | 102.9 | 23.5 | 101.3 | 19.3 | −1.6 | −4.3 |
| B2-101109 | 15000 | 30 | 28.8 | 0 | 2 | 107.6 | 28.9 | 102.8 | 25.9 | −4.8 | −3.0 |
| B3-101109 | 20000 | 30 | 29.1 | 0 | 2 | 108.8 | 28.8 | 104.6 | 21.5 | −4.2 | −7.3 |
| B4-101109 | 25000 | 30 | 29.3 | 0 | 2 | 109.1 | 21.7 | 104.1 | 27.7 | −5.0 | 6.0 |
| B5-101109 | 30000 | 30 | 29.4 | 0 | 2 | 109.4 | 19.0 | 106.7 | 23.7 | −2.7 | 4.6 |
| B6-101109 | 35000 | 30 | 29.5 | 0 | 2 | 107.9 | 21.6 | 105.6 | 15.9 | −2.3 | −5.7 |
| C1-101109 | 10000 | 30 | 27.6 | 0 | 3 | 101.6 | 21.5 | 99.1 | 19.1 | −2.5 | −2.5 |
| C2-101109 | 15000 | 30 | 28.4 | 0 | 3 | 105.7 | 30.8 | 102.9 | 24.3 | −2.8 | −6.5 |
| C3-101109 | 20000 | 30 | 28.8 | 0 | 3 | 107.2 | 27.6 | 102.3 | 20.1 | −4.9 | −7.5 |
| C4-101109 | 25000 | 30 | 29.0 | 0 | 3 | 109.7 | 29.1 | 105.0 | 19.6 | −4.7 | −9.5 |
| C5-101109 | 30000 | 30 | 29.2 | 0 | 3 | 109.0 | 27.6 | 106.7 | 19.3 | −2.3 | −8.4 |
| C6-101109 | 35000 | 30 | 29.3 | 0 | 3 | 107.7 | 24.8 | 104.8 | 19.5 | −2.9 | −5.3 |
| D1-101109 | 10000 | 30 | 27.1 | 0 | 4 | 98.8 | 22.3 | 100.7 | 19.0 | 1.9 | −3.3 |
| D2-101109 | 15000 | 30 | 28.0 | 0 | 4 | 105.9 | 37.9 | 103.0 | 39.0 | −2.9 | 1.1 |
| D3-101109 | 20000 | 30 | 28.5 | 0 | 4 | 110.1 | 31.2 | 105.3 | 27.5 | −4.8 | −3.8 |
| D4-101109 | 25000 | 30 | 28.7 | 0 | 4 | 107.4 | 27.2 | 104.6 | 25.9 | −2.8 | −1.3 |
| D5-101109 | 30000 | 30 | 28.9 | 0 | 4 | 106.0 | 34.5 | 103.5 | 23.5 | −2.5 | −11.1 |
| D6-101109 | 35000 | 30 | 29.1 | 0 | 4 | 106.8 | 23.3 | 108.6 | 19.1 | 1.8 | −4.2 |
| A1-101110 | 10000 | 40 | 39.3 | 0 | 0 | 101.1 | 10.9 | 110.2 | 13.3 | 9.1 | 2.4 |
| A2-101110 | 15000 | 40 | 39.5 | 0 | 0 | 101.3 | 9.4 | 106.0 | 9.1 | 4.7 | −0.3 |
| A3-101110 | 20000 | 40 | 39.7 | 0 | 0 | 94.3 | 9.5 | 98.8 | 10.0 | 4.5 | 0.5 |
| A4-101110 | 25000 | 40 | 39.7 | 0 | 0 | 108.4 | 9.0 | 109.7 | 9.0 | 1.3 | −0.1 |
| A5-101110 | 30000 | 40 | 39.8 | 0 | 0 | 109.9 | 9.1 | 114.7 | 8.6 | 4.8 | −0.5 |
| A6-101110 | 35000 | 40 | 39.8 | 0 | 0 | 111.8 | 8.9 | 112.7 | 8.8 | 0.9 | −0.1 |
| B1-101110 | 10000 | 40 | 37.6 | 0 | 2 | 106.7 | 46.4 | 107.4 | 22.7 | 0.7 | −23.7 |
| B2-101110 | 15000 | 40 | 38.4 | 0 | 2 | 109.4 | 30.2 | 108.0 | 21.1 | −1.4 | −9.1 |
| B3-101110 | 20000 | 40 | 38.8 | 0 | 2 | 110.1 | 37.7 | 107.6 | 23.3 | −2.5 | −14.4 |
| B4-101110 | 25000 | 40 | 39.0 | 0 | 2 | 111.0 | 34.8 | 108.4 | 21.3 | −2.6 | −13.5 |
| B5-101110 | 30000 | 40 | 39.2 | 0 | 2 | 111.0 | 28.5 | 109.3 | 23.1 | −1.7 | −5.3 |
| B6-101110 | 35000 | 40 | 39.3 | 0 | 2 | 110.8 | 22.8 | 110.3 | 11.5 | −0.5 | −11.3 |
| C1-101110 | 10000 | 40 | 36.8 | 0 | 3 | 104.8 | 33.5 | 105.0 | 22.7 | 0.2 | −10.8 |
| C2-101110 | 15000 | 40 | 37.8 | 0 | 3 | 108.5 | 38.4 | 108.0 | 37.4 | −0.5 | −1.1 |
| C3-101110 | 20000 | 40 | 38.3 | 0 | 3 | 109.9 | 54.5 | 108.7 | 33.8 | −1.2 | −20.7 |
| C4-101110 | 25000 | 40 | 38.7 | 0 | 3 | 110.7 | 32.0 | 109.1 | 22.4 | −1.6 | −9.6 |
| C5-101110 | 30000 | 40 | 38.9 | 0 | 3 | 110.2 | 31.5 | 110.3 | 28.4 | 0.1 | −3.1 |
| C6-101110 | 35000 | 40 | 39.0 | 0 | 3 | 109.7 | 33.4 | 110.3 | 13.7 | 0.6 | −19.6 |

TABLE 4-continued

| Coating ID | Target PDMS Mn (g/mole) | % Oligomer added | % actual PDMS added | EC = 0; GC = 1 | Number of Caprolactone per Hydroxyl | Initial Water Contact Angle (deg) | Initial Average Force at Release (N) | Water Contact Angle after water immersion (deg) | Average Force at Release after water immersion (N) | Change in Water Contact Angle (deg) | Change in Force at Release (N) |
|---|---|---|---|---|---|---|---|---|---|---|---|
| D1-101110 | 10000 | 40 | 36.1 | 0 | 4 | 103.6 | 22.8 | 105.5 | 30.6 | 1.9 | 7.8 |
| D2-101110 | 15000 | 40 | 37.3 | 0 | 4 | 107.9 | 44.5 | 108.8 | 31.3 | 0.9 | −13.2 |
| D3-101110 | 20000 | 40 | 37.9 | 0 | 4 | 109.1 | 52.0 | 108.5 | 30.8 | −0.6 | −21.3 |
| D4-101110 | 25000 | 40 | 38.3 | 0 | 4 | 109.1 | 39.5 | 105.7 | 27.9 | −3.4 | −11.5 |
| D5-101110 | 30000 | 40 | 38.6 | 0 | 4 | 109.1 | 44.3 | 107.8 | 29.1 | −1.3 | −15.2 |
| D6-101110 | 35000 | 40 | 38.8 | 0 | 4 | 109.0 | 35.0 | 109.1 | 27.2 | 0.1 | −7.8 |
| A1-101119 | 10000 | 10 | 9.8 | 1 | 0 | 102.9 | 19.3 | 98.7 | 22.7 | −4.2 | 3.5 |
| A2-101119 | 15000 | 10 | 9.9 | 1 | 0 | 106.7 | 19.0 | 103.9 | 14.0 | −2.8 | −5.1 |
| A3-101119 | 20000 | 10 | 9.9 | 1 | 0 | 110.1 | 12.3 | 105.6 | 11.9 | −4.5 | −0.4 |
| A4-101119 | 25000 | 10 | 9.9 | 1 | 0 | 110.8 | 18.3 | 107.2 | 13.0 | −3.6 | −5.3 |
| A5-101119 | 30000 | 10 | 9.9 | 1 | 0 | 112.1 | 11.9 | 110.8 | 9.1 | −1.3 | −2.7 |
| A6-101119 | 35000 | 10 | 9.9 | 1 | 0 | 111.1 | 17.0 | 110.2 | 11.2 | −0.9 | −5.8 |
| B1-101119 | 10000 | 10 | 9.4 | 1 | 2 | 101.1 | 17.6 | 95.6 | 9.4 | −5.5 | −8.1 |
| B2-101119 | 15000 | 10 | 9.6 | 1 | 2 | 105.5 | 18.4 | 100.6 | 12.5 | −4.9 | −5.9 |
| B3-101119 | 20000 | 10 | 9.7 | 1 | 2 | 106.7 | 17.3 | 102.1 | 15.9 | −4.6 | −1.4 |
| B4-101119 | 25000 | 10 | 9.8 | 1 | 2 | 108.0 | 21.0 | 105.4 | 17.9 | −2.6 | −3.1 |
| B5-101119 | 30000 | 10 | 9.8 | 1 | 2 | 107.9 | 25.6 | 103.6 | 17.4 | −4.3 | −8.2 |
| B6-101119 | 35000 | 10 | 9.8 | 1 | 2 | 107.1 | 30.4 | 106.6 | 14.0 | −0.5 | −16.5 |
| C1-101119 | 10000 | 10 | 9.2 | 1 | 3 | 99.5 | 16.5 | 95.3 | 9.9 | −4.2 | −6.6 |
| C2-101119 | 15000 | 10 | 9.5 | 1 | 3 | 104.4 | 20.7 | 100.4 | 18.0 | −4.0 | −2.7 |
| C3-101119 | 20000 | 10 | 9.6 | 1 | 3 | 106.6 | 17.3 | 99.8 | 20.8 | −6.8 | 3.5 |
| C4-101119 | 25000 | 10 | 9.7 | 1 | 3 | 106.9 | 21.3 | 103.5 | 21.5 | −3.4 | 0.2 |
| C5-101119 | 30000 | 10 | 9.7 | 1 | 3 | 107.2 | 23.2 | 104.3 | 18.8 | −2.9 | −4.4 |
| C6-101119 | 35000 | 10 | 9.8 | 1 | 3 | 106.1 | 31.0 | 103.6 | 21.6 | −2.5 | −9.4 |
| D1-101119 | 10000 | 10 | 9.0 | 1 | 4 | 99.3 | 14.2 | 94.6 | 18.9 | −4.7 | 4.7 |
| D2-101119 | 15000 | 10 | 9.3 | 1 | 4 | 102.3 | 21.7 | 97.6 | 16.6 | −4.7 | −5.1 |
| D3-101119 | 20000 | 10 | 9.5 | 1 | 4 | 104.3 | 25.6 | 100.7 | 19.6 | −3.6 | −6.0 |
| D4-101119 | 25000 | 10 | 9.6 | 1 | 4 | 105.0 | 20.8 | 99.6 | 21.1 | −5.4 | 0.3 |
| D5-101119 | 30000 | 10 | 9.6 | 1 | 4 | 105.7 | 26.9 | 101.0 | 18.8 | −4.7 | −8.1 |
| D6-101119 | 35000 | 10 | 9.7 | 1 | 4 | 106.0 | 29.9 | 105.0 | 17.6 | −1.0 | −12.3 |
| A1-101120 | 10000 | 20 | 19.7 | 1 | 0 | 104.1 | 25.1 | 103.0 | 39.6 | −1.1 | 14.5 |
| A2-101120 | 15000 | 20 | 19.8 | 1 | 0 | 105.6 | 26.6 | 104.4 | 23.8 | −1.2 | −2.8 |
| A3-101120 | 20000 | 20 | 19.8 | 1 | 0 | 107.4 | 21.0 | 106.4 | 24.2 | −1.0 | 3.2 |
| A4-101120 | 25000 | 20 | 19.9 | 1 | 0 | 107.1 | 19.3 | 108.4 | 13.5 | 1.3 | −5.8 |
| A5-101120 | 30000 | 20 | 19.9 | 1 | 0 | 108.6 | 13.1 | 108.5 | 10.5 | −0.1 | −2.6 |
| A6-101120 | 35000 | 20 | 19.9 | 1 | 0 | 108.4 | 18.6 | 108.4 | 14.5 | 0.0 | −4.1 |

TABLE 4-continued

| Coating ID | Target PDMS Mn (g/mole) | % Oligomer added | % actual PDMS added | EC = 0; GC = 1 | Number of Caprolactone per Hydroxyl | Initial Water Contact Angle (deg) | Initial Average Force at Release (N) | Water Contact Angle after water immersion (deg) | Average Force at Release after water immersion (N) | Change in Water Contact Angle (deg) | Change in Force at Release (N) |
|---|---|---|---|---|---|---|---|---|---|---|---|
| B1-101120 | 10000 | 20 | 18.8 | 1 | 2 | 100.5 | 20.7 | 98.6 | 13.3 | −1.9 | −7.4 |
| B2-101120 | 15000 | 20 | 19.2 | 1 | 2 | 103.7 | 25.5 | 102.8 | 20.3 | −0.9 | −5.2 |
| B3-101120 | 20000 | 20 | 19.4 | 1 | 2 | 104.5 | 23.3 | 104.0 | 24.4 | −0.5 | 1.1 |
| B4-101120 | 25000 | 20 | 19.5 | 1 | 2 | 106.6 | 22.7 | 107.0 | 16.8 | 0.4 | −5.9 |
| B5-101120 | 30000 | 20 | 19.6 | 1 | 2 | 106.4 | 24.0 | 105.6 | 17.4 | −0.8 | −6.6 |
| B6-101120 | 35000 | 20 | 19.6 | 1 | 2 | 106.6 | 28.0 | 107.7 | 17.5 | 1.1 | −10.5 |
| C1-101120 | 10000 | 20 | 18.4 | 1 | 3 | 99.0 | 20.4 | 97.4 | 11.4 | −1.6 | −9.0 |
| C2-101120 | 15000 | 20 | 18.9 | 1 | 3 | 101.9 | 21.6 | 101.4 | 14.7 | −0.5 | −6.9 |
| C3-101120 | 20000 | 20 | 19.2 | 1 | 3 | 104.7 | 26.7 | 104.2 | 13.1 | −0.5 | −13.6 |
| C4-101120 | 25000 | 20 | 19.3 | 1 | 3 | 105.8 | 21.7 | 104.0 | 14.1 | −1.8 | −7.5 |
| C5-101120 | 30000 | 20 | 19.4 | 1 | 3 | 106.4 | 28.4 | 105.4 | 12.7 | −1.0 | −15.7 |
| C6-101120 | 35000 | 20 | 19.5 | 1 | 3 | 106.7 | 24.2 | 106.3 | 13.3 | −0.4 | −10.9 |
| D1-101120 | 10000 | 20 | 18.0 | 1 | 4 | 99.0 | 9.4 | 96.0 | 14.8 | −3.0 | 5.4 |
| D2-101120 | 15000 | 20 | 18.6 | 1 | 4 | 98.8 | 9.2 | 98.4 | 8.4 | −0.4 | −0.8 |
| D3-101120 | 20000 | 20 | 19.0 | 1 | 4 | 101.4 | 10.0 | 101.4 | 8.7 | 0.0 | −1.4 |
| D4-101120 | 25000 | 20 | 19.2 | 1 | 4 | 103.8 | 24.3 | 101.6 | 14.3 | −2.2 | −10.1 |
| D5-101120 | 30000 | 20 | 19.3 | 1 | 4 | 105.0 | 25.7 | 103.6 | 12.0 | −1.4 | −13.7 |
| D6-101120 | 35000 | 20 | 19.4 | 1 | 4 | 105.3 | 34.6 | 104.6 | 17.0 | −0.7 | −17.6 |
| A1-101121 | 10000 | 30 | 29.5 | 1 | 0 | 100.6 | 23.7 | 102.6 | 29.3 | 2.0 | 5.5 |
| A2-101121 | 15000 | 30 | 29.7 | 1 | 0 | 108.3 | 37.4 | 106.2 | 21.7 | −2.1 | −15.7 |
| A3-101121 | 20000 | 30 | 29.7 | 1 | 0 | 110.2 | 21.6 | 107.8 | 10.9 | −2.4 | −10.7 |
| A4-101121 | 25000 | 30 | 29.8 | 1 | 0 | 108.0 | 29.3 | 109.1 | 13.7 | 1.1 | −15.7 |
| A5-101121 | 30000 | 30 | 29.8 | 1 | 0 | 111.2 | 16.5 | 110.9 | 8.8 | −0.3 | −7.8 |
| A6-101121 | 35000 | 30 | 29.8 | 1 | 0 | 111.3 | 23.3 | 114.0 | 10.7 | 2.7 | −12.6 |
| B1-101121 | 10000 | 30 | 28.2 | 1 | 2 | 96.7 | 17.1 | 100.1 | 16.3 | 3.4 | −0.8 |
| B2-101121 | 15000 | 30 | 28.8 | 1 | 2 | 104.8 | 32.5 | 104.0 | 43.5 | −0.8 | 10.9 |
| B3-101121 | 20000 | 30 | 29.1 | 1 | 2 | 107.0 | 37.7 | 105.2 | 40.5 | −1.8 | 2.8 |
| B4-101121 | 25000 | 30 | 29.3 | 1 | 2 | 107.6 | 33.2 | 106.7 | 31.5 | −0.9 | −1.8 |
| B5-101121 | 30000 | 30 | 29.4 | 1 | 2 | 108.0 | 46.0 | 109.9 | 22.7 | 1.9 | −23.3 |
| B6-101121 | 35000 | 30 | 29.5 | 1 | 2 | 107.7 | 52.0 | 111.1 | 32.0 | 3.4 | −20.0 |
| C1-101121 | 10000 | 30 | 27.6 | 1 | 3 | 96.0 | 22.7 | 96.6 | 29.9 | 0.6 | 7.2 |
| C2-101121 | 15000 | 30 | 28.4 | 1 | 3 | 105.3 | 40.4 | 100.1 | 38.9 | −5.2 | −1.5 |
| C3-101121 | 20000 | 30 | 28.8 | 1 | 3 | 107.2 | 39.8 | 104.6 | 33.6 | −2.6 | −6.2 |
| C4-101121 | 25000 | 30 | 29.0 | 1 | 3 | 107.4 | 28.3 | 107.8 | 34.8 | 0.4 | 6.5 |
| C5-101121 | 30000 | 30 | 29.2 | 1 | 3 | 107.5 | 40.7 | 109.2 | 27.5 | 1.7 | −13.2 |
| C6-101121 | 35000 | 30 | 29.3 | 1 | 3 | 107.5 | 45.0 | 110.2 | 14.6 | 2.7 | −30.4 |

TABLE 4-continued

| Coating ID | Target PDMS Mn (g/mole) | % Oligomer added | % actual PDMS added | EC = 0; GC = 1 | Number of Caprolactone per Hydroxyl | Initial Water Contact Angle (deg) | Initial Average Force at Release (N) | Water Contact Angle after water immersion (deg) | Average Force at Release after water immersion (N) | Change in Water Contact Angle (deg) | Change in Force at Release (N) |
|---|---|---|---|---|---|---|---|---|---|---|---|
| D1-101121 | 10000 | 30 | 27.1 | 1 | 4 | 95.3 | 21.9 | 98.3 | 14.6 | 3.0 | −7.3 |
| D2-101121 | 15000 | 30 | 28.0 | 1 | 4 | 100.7 | 10.0 | 101.1 | 19.0 | 0.4 | 9.0 |
| D3-101121 | 20000 | 30 | 28.5 | 1 | 4 | 102.9 | 31.4 | 101.9 | 32.9 | −1.0 | 1.5 |
| D4-101121 | 25000 | 30 | 28.7 | 1 | 4 | 105.4 | 26.1 | 105.9 | 34.8 | 0.5 | 8.7 |
| D5-101121 | 30000 | 30 | 28.9 | 1 | 4 | 104.3 | 27.1 | 108.3 | 25.7 | 4.0 | −1.4 |
| D6-101121 | 35000 | 30 | 29.1 | 1 | 4 | 106.2 | 31.8 | 109.2 | 26.0 | 3.0 | −5.8 |
| A1-101122 | 10000 | 40 | 39.3 | 1 | 0 | 103.5 | 39.4 | 102.4 | 45.7 | −1.1 | 6.2 |
| A2-101122 | 15000 | 40 | 39.5 | 1 | 0 | 104.9 | 38.0 | 106.2 | 21.2 | 1.3 | −16.8 |
| A3-101122 | 20000 | 40 | 39.7 | 1 | 0 | 107.2 | 17.8 | 106.9 | 18.9 | −0.3 | 1.2 |
| A4-101122 | 25000 | 40 | 39.7 | 1 | 0 | 107.9 | 25.3 | 108.9 | 17.6 | 1.0 | −7.7 |
| A5-101122 | 30000 | 40 | 39.8 | 1 | 0 | 112.2 | 18.8 | 112.6 | 9.4 | 0.4 | −9.4 |
| A6-101122 | 35000 | 40 | 39.8 | 1 | 0 | 108.4 | 22.5 | 111.4 | 8.5 | 3.0 | −14.0 |
| B1-101122 | 10000 | 40 | 37.6 | 1 | 2 | 103.8 | 35.0 | 102.9 | 23.9 | −0.9 | −11.1 |
| B2-101122 | 15000 | 40 | 38.4 | 1 | 2 | 105.4 | 41.9 | 107.0 | 35.0 | 1.6 | −6.8 |
| B3-101122 | 20000 | 40 | 38.8 | 1 | 2 | 106.6 | 45.6 | 107.1 | 36.9 | 0.5 | −8.7 |
| B4-101122 | 25000 | 40 | 39.0 | 1 | 2 | 108.1 | 44.1 | 106.9 | 34.2 | −1.2 | −9.9 |
| B5-101122 | 30000 | 40 | 39.2 | 1 | 2 | 107.4 | 58.2 | 107.1 | 31.4 | −0.3 | −26.8 |
| B6-101122 | 35000 | 40 | 39.3 | 1 | 2 | 107.4 | 60.7 | 106.8 | 28.7 | −0.6 | −32.0 |
| C1-101122 | 10000 | 40 | 36.8 | 1 | 3 | 98.7 | 21.9 | 97.5 | 18.6 | −1.2 | −3.3 |
| C2-101122 | 15000 | 40 | 37.8 | 1 | 3 | 104.9 | 41.0 | 106.2 | 30.5 | 1.3 | −10.5 |
| C3-101122 | 20000 | 40 | 38.3 | 1 | 3 | 106.7 | 46.3 | 107.5 | 35.9 | 0.8 | −10.4 |
| C4-101122 | 25000 | 40 | 38.7 | 1 | 3 | 107.4 | 35.6 | 106.1 | 30.5 | −1.3 | −5.1 |
| C5-101122 | 30000 | 40 | 38.9 | 1 | 3 | 107.1 | 41.1 | 107.6 | 34.3 | 0.5 | −6.8 |
| C6-101122 | 35000 | 40 | 39.0 | 1 | 3 | 106.7 | 54.3 | 106.0 | 23.3 | −0.7 | −30.9 |
| D1-101122 | 10000 | 40 | 36.1 | 1 | 4 | 101.5 | 25.0 | 99.5 | 27.1 | −2.0 | 2.0 |
| D2-101122 | 15000 | 40 | 37.3 | 1 | 4 | 101.5 | 34.1 | 101.1 | 27.4 | −0.4 | −6.8 |
| D3-101122 | 20000 | 40 | 37.9 | 1 | 4 | 104.0 | 51.5 | 102.7 | 32.5 | −1.3 | −19.0 |
| D4-101122 | 25000 | 40 | 38.3 | 1 | 4 | 104.3 | 27.9 | 103.2 | 30.0 | −1.1 | 2.1 |
| D5-101122 | 30000 | 40 | 38.6 | 1 | 4 | 104.9 | 56.6 | 100.9 | 39.3 | −4.0 | −17.3 |
| D6-101122 | 35000 | 40 | 38.8 | 1 | 4 | 104.7 | 44.1 | 106.1 | 27.7 | 1.4 | −16.4 |

TABLE 5

| Coating ID | Target PDMS Mn (g/mole) | % Oligomer added | % actual PDMS added | EC = 0; GC = 1 | Number of Caprolactone per Hydroxyl | Initial Water Contact Angel (deg) | Initial Methylene Iodide Contact Angel (deg) | Water Contact Angle after water immersion (deg) | Methylene Iodide Contact Angel after water immersion (deg) | Change in Water Contact Angle (deg) | Change in Methylene Iodide Contact Angle (deg) |
|---|---|---|---|---|---|---|---|---|---|---|---|
| A1-101046 | 2500 | 10 | 9.3 | 0 | 0 | 93.4 | 79.6 | 93.2 | 81.4 | −0.2 | 1.8 |
| A2-101046 | 2500 | 10 | 9.1 | 1 | 0 | 97.5 | 88.7 | 97.5 | 86.0 | 0.0 | −2.7 |
| A3-101046 | 5000 | 10 | 9.7 | 0 | 0 | 97.1 | 78.5 | 96.5 | 83.4 | −0.6 | 4.9 |
| A4-101046 | 5000 | 10 | 9.5 | 1 | 0 | 98.1 | 85.8 | 97.0 | 87.0 | −1.1 | 1.2 |
| A5-101046 | 7500 | 10 | 9.8 | 0 | 0 | 97.9 | 86.3 | 96.0 | 87.6 | −1.9 | 1.3 |
| A6-101046 | 7500 | 10 | 9.7 | 1 | 0 | 98.6 | 90.1 | 98.5 | 89.7 | −0.1 | −0.4 |
| B1-101046 | 2500 | 10 | 8.0 | 0 | 2 | 97.4 | 75.5 | 90.5 | 80.6 | −6.9 | 5.1 |
| B2-101046 | 2500 | 10 | 6.9 | 1 | 2 | 98.2 | 78.3 | 91.4 | 78.3 | −6.8 | 0.0 |
| B3-101046 | 5000 | 10 | 8.9 | 0 | 2 | 98.3 | 76.0 | 96.7 | 83.0 | −1.6 | 7.0 |
| B4-101046 | 5000 | 10 | 8.1 | 1 | 2 | 98.1 | 77.5 | 96.0 | 83.0 | −2.1 | 5.5 |
| B5-101046 | 7500 | 10 | 9.2 | 0 | 2 | 97.2 | 82.9 | 96.8 | 80.7 | −0.4 | −2.2 |
| B6-101046 | 7500 | 10 | 8.7 | 1 | 2 | 97.0 | 87.0 | 95.0 | 87.3 | −2.0 | 0.3 |
| C1-101046 | 2500 | 10 | 7.4 | 0 | 3 | 98.3 | 74.6 | 88.8 | 76.0 | −9.5 | 1.4 |
| C2-101046 | 2500 | 10 | 6.1 | 1 | 3 | 98.3 | 77.5 | 82.3 | 79.3 | −16.0 | 1.8 |
| C3-101046 | 5000 | 10 | 8.5 | 0 | 3 | 96.9 | 76.1 | 95.5 | 81.2 | −1.4 | 5.1 |
| C4-101046 | 5000 | 10 | 7.6 | 1 | 3 | 98.4 | 77.5 | 96.0 | 81.7 | −2.4 | 4.2 |
| C5-101046 | 7500 | 10 | 9.0 | 0 | 3 | 98.3 | 83.0 | 95.7 | 83.4 | −2.6 | 0.4 |
| C6-101046 | 7500 | 10 | 8.2 | 1 | 3 | 97.4 | 89.2 | 95.0 | 83.0 | −2.4 | −6.2 |
| D1-101046 | 2500 | 10 | 7.0 | 0 | 4 | 97.1 | 77.8 | — | 80.1 | — | 2.3 |
| D2-101046 | 2500 | 10 | 5.5 | 1 | 4 | 98.2 | 77.3 | 87.7 | 78.7 | −10.5 | 1.4 |
| D3-101046 | 5000 | 10 | 8.2 | 0 | 4 | 97.6 | 73.8 | 93.5 | 81.1 | −4.1 | 7.3 |
| D4-101046 | 5000 | 10 | 7.1 | 1 | 4 | 100.7 | 72.8 | 95.6 | 75.3 | −5.1 | 2.5 |
| D5-101046 | 7500 | 10 | 8.7 | 0 | 4 | 97.8 | 84.0 | 94.5 | 83.9 | −3.3 | −0.1 |
| D6-101046 | 7500 | 10 | 7.8 | 1 | 4 | 97.7 | 78.2 | 97.9 | 83.7 | 0.2 | 5.5 |
| A1-101047 | 2500 | 20 | 18.7 | 0 | 0 | 94.6 | 81.6 | 95.0 | 85.7 | 0.4 | 4.1 |
| A2-101047 | 2500 | 20 | 18.3 | 1 | 0 | 99.4 | 88.7 | 99.2 | 84.5 | −0.2 | −4.2 |
| A3-101047 | 5000 | 20 | 19.3 | 0 | 0 | 100.0 | 89.1 | 99.6 | 85.8 | −0.4 | −3.3 |
| A4-101047 | 5000 | 20 | 19.1 | 1 | 0 | 100.1 | 89.6 | 99.7 | 78.9 | −0.4 | −10.7 |
| A5-101047 | 7500 | 20 | 19.5 | 0 | 0 | 100.6 | 91.0 | 99.3 | 78.3 | −1.3 | −12.7 |
| A6-101047 | 7500 | 20 | 19.4 | 1 | 0 | 100.4 | 91.7 | 100.7 | 85.0 | 0.3 | −6.7 |
| B1-101047 | 2500 | 20 | 16.0 | 0 | 2 | 98.4 | 78.3 | 93.6 | 78.7 | −4.8 | 0.4 |
| B2-101047 | 2500 | 20 | 13.7 | 1 | 2 | 99.0 | 76.8 | 93.6 | 77.1 | −5.4 | 0.3 |
| B3-101047 | 5000 | 20 | 17.8 | 0 | 2 | 100.4 | 85.3 | 97.5 | 76.8 | −2.9 | −8.5 |
| B4-101047 | 5000 | 20 | 16.3 | 1 | 2 | 100.0 | 83.7 | 97.7 | 77.2 | −2.3 | −6.5 |
| B5-101047 | 7500 | 20 | 18.4 | 0 | 2 | 99.8 | 89.0 | 99.3 | 78.7 | −0.5 | −10.3 |
| B6-101047 | 7500 | 20 | 17.3 | 1 | 2 | 98.7 | 89.0 | 97.3 | 75.3 | −1.4 | −13.7 |

TABLE 5-continued

| Coating ID | Target PDMS Mn (g/mole) | % Oligomer added | % actual PDMS added | EC = 0; GC = 1 | Number of Caprolactone per Hydroxyl | Initial Water Contact Angel (deg) | Initial Methylene Iodide Contact Angel (deg) | Water Contact Angle after water immersion (deg) | Methylene Iodide Contact Angel after water immersion (deg) | Change in Water Contact Angle (deg) | Change in Methylene Iodide Contact Angle (deg) |
|---|---|---|---|---|---|---|---|---|---|---|---|
| C1-101047 | 2500 | 20 | 14.9 | 0 | 3 | 98.5 | 84.1 | 92.2 | 75.4 | −6.3 | −8.7 |
| C2-101047 | 2500 | 20 | 12.2 | 1 | 3 | 97.6 | 78.3 | 94.6 | 74.6 | −3.0 | −3.7 |
| C3-101047 | 5000 | 20 | 17.1 | 0 | 3 | 98.6 | 81.4 | 96.1 | 76.5 | −2.5 | −4.9 |
| C4-101047 | 5000 | 20 | 15.1 | 1 | 3 | 99.3 | 87.0 | 99.0 | 78.2 | −0.3 | −8.8 |
| C5-101047 | 7500 | 20 | 17.9 | 0 | 3 | 99.6 | 85.7 | 97.1 | 76.2 | −2.5 | −9.5 |
| C6-101047 | 7500 | 20 | 16.5 | 1 | 3 | 98.2 | 86.6 | 97.2 | 70.4 | −1.0 | −16.2 |
| D1-101047 | 2500 | 20 | 13.9 | 0 | 4 | 97.4 | 81.6 | 97.8 | 80.4 | 0.4 | −1.2 |
| D2-101047 | 2500 | 20 | 11.0 | 1 | 4 | 99.6 | 80.5 | 96.1 | 72.0 | −3.5 | −8.5 |
| D3-101047 | 5000 | 20 | 16.4 | 0 | 4 | 98.4 | 80.6 | 97.2 | 74.8 | −1.2 | −5.8 |
| D4-101047 | 5000 | 20 | 14.2 | 1 | 4 | 97.2 | 88.6 | 100.4 | 74.3 | 3.2 | −14.3 |
| D5-101047 | 7500 | 20 | 17.5 | 0 | 4 | 98.4 | 84.5 | 101.1 | 71.8 | 2.7 | −12.7 |
| D6-101047 | 7500 | 20 | 15.7 | 1 | 4 | 80.8 | 87.1 | 101.7 | 85.5 | 20.9 | −1.6 |
| A1-101048 | 2500 | 30 | 28.0 | 0 | 0 | 95.9 | 84.1 | 96.1 | 86.4 | 0.2 | 2.3 |
| A2-101048 | 2500 | 30 | 27.4 | 1 | 0 | 100.5 | 90.8 | 98.0 | 84.6 | −2.5 | −6.2 |
| A3-101048 | 5000 | 30 | 29.0 | 0 | 0 | 100.3 | 91.7 | 97.7 | 89.2 | −2.6 | −2.5 |
| A4-101048 | 5000 | 30 | 28.6 | 1 | 0 | 101.4 | 91.9 | 99.9 | 90.6 | −1.5 | −1.3 |
| A5-101048 | 7500 | 30 | 29.3 | 0 | 0 | 101.2 | 92.6 | 99.6 | 94.4 | −1.6 | 1.8 |
| A6-101048 | 7500 | 30 | 29.1 | 1 | 0 | 102.4 | 93.6 | 100.5 | 95.2 | −1.9 | 1.6 |
| B1-101048 | 2500 | 30 | 23.9 | 0 | 2 | 99.3 | 81.1 | 90.8 | 77.8 | −8.5 | −3.3 |
| B2-101048 | 2500 | 30 | 20.6 | 1 | 2 | 98.5 | 81.5 | 92.2 | 81.4 | −6.3 | −0.1 |
| B3-101048 | 5000 | 30 | 26.6 | 0 | 2 | 101.7 | 90.8 | 98.7 | 89.2 | −3.0 | −1.6 |
| B4-101048 | 5000 | 30 | 24.4 | 1 | 2 | 100.9 | 89.2 | 99.1 | 86.8 | −1.8 | −2.4 |
| B5-101048 | 7500 | 30 | 27.7 | 0 | 2 | 101.6 | 93.3 | 99.5 | 92.8 | −2.1 | −0.5 |
| B6-101048 | 7500 | 30 | 26.0 | 1 | 2 | 100.9 | 94.0 | 99.8 | 91.4 | −1.1 | −2.6 |
| C1-101048 | 2500 | 30 | 22.3 | 0 | 3 | 99.1 | 80.4 | 92.2 | 77.1 | −6.9 | −3.3 |
| C2-101048 | 2500 | 30 | 18.3 | 1 | 3 | 98.4 | 82.7 | 93.9 | 79.2 | −4.5 | −3.5 |
| C3-101048 | 5000 | 30 | 25.6 | 0 | 3 | 98.9 | 85.9 | 97.4 | 85.6 | −1.5 | −0.3 |
| C4-101048 | 5000 | 30 | 22.7 | 1 | 3 | 98.9 | 88.7 | 97.3 | 86.3 | −1.6 | −2.4 |
| C5-101048 | 7500 | 30 | 26.9 | 0 | 3 | 100.3 | 88.0 | 98.2 | 87.6 | −2.1 | −0.4 |
| C6-101048 | 7500 | 30 | 24.7 | 1 | 3 | 98.2 | 90.9 | 97.9 | 88.6 | −0.3 | −2.3 |
| D1-101048 | 2500 | 30 | 20.9 | 0 | 4 | 97.9 | 82.0 | 90.7 | 80.0 | −7.2 | −2.0 |
| D2-101048 | 2500 | 30 | 16.4 | 1 | 4 | 98.2 | 83.0 | 89.5 | 78.3 | −8.7 | −4.7 |
| D3-101048 | 5000 | 30 | 24.6 | 0 | 4 | 97.2 | 86.6 | 96.0 | 86.8 | −1.2 | 0.2 |
| D4-101048 | 5000 | 30 | 21.2 | 1 | 4 | 98.3 | 87.6 | 95.6 | 88.1 | −2.7 | 0.5 |
| D5-101048 | 7500 | 30 | 26.2 | 0 | 4 | 99.9 | 92.2 | 98.1 | 88.2 | −1.8 | −4.0 |
| D6-101048 | 7500 | 30 | 23.5 | 1 | 4 | 98.9 | 90.3 | 97.4 | 88.1 | −1.5 | −2.2 |

TABLE 5-continued

| Coating ID | Target PDMS Mn (g/mole) | % Oligomer added | % actual PDMS added | EC = 0; GC = 1 | Number of Caprolactone per Hydroxyl | Initial Water Contact Angel (deg) | Initial Methylene Iodide Contact Angel (deg) | Water Contact Angle after water immersion (deg) | Methylene Iodide Contact Angel after water immersion (deg) | Change in Water Contact Angle (deg) | Change in Methylene Iodide Contact Angle (deg) |
|---|---|---|---|---|---|---|---|---|---|---|---|
| A1-101049 | 2500 | 40 | 37.4 | 0 | 0 | 97.8 | 75.4 | 96.5 | 83.6 | −1.3 | 8.2 |
| A2-101049 | 2500 | 40 | 36.5 | 1 | 0 | 100.9 | 87.2 | 99.8 | 86.7 | −1.1 | −0.5 |
| A3-101049 | 5000 | 40 | 38.6 | 0 | 0 | 102.5 | 93.4 | 101.5 | 86.8 | −1.0 | −6.6 |
| A4-101049 | 5000 | 40 | 38.2 | 1 | 0 | 101.2 | 84.8 | 99.9 | 88.3 | −1.3 | 3.5 |
| A5-101049 | 7500 | 40 | 39.1 | 0 | 0 | 99.7 | 88.2 | 101.2 | 88.5 | 1.5 | 0.3 |
| A6-101049 | 7500 | 40 | 38.8 | 1 | 0 | 102.7 | 87.2 | 103.0 | 83.5 | 0.3 | −3.7 |
| B1-101049 | 2500 | 40 | 31.9 | 0 | 2 | 97.2 | 77.4 | 91.1 | 80.0 | −6.1 | 2.6 |
| B2-101049 | 2500 | 40 | 27.4 | 1 | 2 | 98.0 | 80.1 | 97.2 | 83.1 | −0.8 | 3.0 |
| B3-101049 | 5000 | 40 | 35.5 | 0 | 2 | 103.8 | 89.7 | 102.3 | 87.5 | −1.5 | −2.2 |
| B4-101049 | 5000 | 40 | 32.5 | 1 | 2 | 100.8 | 88.0 | 100.4 | 85.1 | −0.4 | −2.9 |
| B5-101049 | 7500 | 40 | 36.9 | 0 | 2 | 102.4 | 86.7 | 103.4 | 90.2 | 1.0 | 3.5 |
| B6-101049 | 7500 | 40 | 34.7 | 1 | 2 | 103.8 | 91.2 | 105.4 | 88.3 | 1.6 | −2.9 |
| C1-101049 | 2500 | 40 | 29.8 | 0 | 3 | 99.7 | 76.7 | 93.2 | 81.4 | −6.5 | 4.7 |
| C2-101049 | 2500 | 40 | 24.4 | 1 | 3 | 99.4 | 78.4 | 95.7 | 81.5 | −3.7 | 3.1 |
| C3-101049 | 5000 | 40 | 34.1 | 0 | 3 | 103.2 | 92.1 | 101.5 | 90.1 | −1.7 | −2.0 |
| C4-101049 | 5000 | 40 | 30.3 | 1 | 3 | 100.4 | 87.1 | 100.2 | 88.9 | −0.2 | 1.8 |
| C5-101049 | 7500 | 40 | 35.9 | 0 | 3 | 101.4 | 85.0 | 102.4 | 83.7 | 1.0 | −1.3 |
| C6-101049 | 7500 | 40 | 32.9 | 1 | 3 | 101.5 | 90.6 | 105.2 | 89.2 | 3.7 | −1.4 |
| D1-101049 | 2500 | 40 | 27.9 | 0 | 4 | 94.5 | 81.9 | 93.9 | 80.4 | −0.6 | −1.5 |
| D2-101049 | 2500 | 40 | 21.9 | 1 | 4 | 97.1 | 74.3 | 91.6 | 83.6 | −5.5 | 9.3 |
| D3-101049 | 5000 | 40 | 32.8 | 0 | 4 | 99.8 | 91.7 | 97.5 | 85.2 | −2.3 | −6.5 |
| D4-101049 | 5000 | 40 | 28.3 | 1 | 4 | 101.0 | 90.5 | 96.3 | 89.8 | −4.7 | −0.7 |
| D5-101049 | 7500 | 40 | 34.9 | 0 | 4 | 99.7 | 88.7 | 100.5 | 88.5 | 0.8 | −0.2 |
| D6-101049 | 7500 | 40 | 31.4 | 1 | 4 | 100.5 | 90.0 | 96.4 | 81.7 | −4.1 | −8.3 |
| A1-101107 | 10000 | 10 | 9.8 | 0 | 0 | 98.6 | 70.0 | 100.0 | 70.3 | 1.4 | 0.3 |
| A2-101107 | 15000 | 10 | 9.9 | 0 | 0 | 99.2 | 72.9 | — | — | — | — |
| A3-101107 | 20000 | 10 | 9.9 | 0 | 0 | 95.7 | 70.2 | — | — | — | — |
| A4-101107 | 25000 | 10 | 9.9 | 0 | 0 | 104.7 | 79.5 | 101.4 | 75.9 | −3.3 | −3.6 |
| A5-101107 | 30000 | 10 | 9.9 | 0 | 0 | 107.6 | 84.1 | — | — | — | — |
| A6-101107 | 35000 | 10 | 9.9 | 0 | 0 | 107.1 | 85.6 | — | — | — | — |
| B1-101107 | 10000 | 10 | 9.4 | 0 | 2 | 103.8 | 97.2 | 102.5 | 84.8 | −1.3 | −12.4 |
| B2-101107 | 15000 | 10 | 9.6 | 0 | 2 | 107.7 | 98.8 | — | — | — | — |
| B3-101107 | 20000 | 10 | 9.7 | 0 | 2 | 109.1 | 100.6 | — | — | — | — |
| B4-101107 | 25000 | 10 | 9.8 | 0 | 2 | 109.0 | 99.3 | 108.5 | 87.4 | −0.5 | −11.9 |
| B5-101107 | 30000 | 10 | 9.8 | 0 | 2 | 109.8 | 100.7 | 109.2 | 83.1 | −0.6 | −17.6 |
| B6-101107 | 35000 | 10 | 9.8 | 0 | 2 | 108.9 | 103.5 | — | — | — | — |

TABLE 5-continued

| Coating ID | Target PDMS Mn (g/mole) | % Oligomer added | % actual PDMS added | EC = 0; GC = 1 | Number of Caprolactone per Hydroxyl | Initial Water Contact Angel (deg) | Initial Methylene Iodide Contact Angel (deg) | Water Contact Angle after water immersion (deg) | Methylene Iodide Contact Angel after water immersion (deg) | Change in Water Contact Angle (deg) | Change in Methylene Iodide Contact Angle (deg) |
|---|---|---|---|---|---|---|---|---|---|---|---|
| C1-101107 | 10000 | 10 | 9.2 | 0 | 3 | 99.9 | 89.7 | 99.1 | 76.0 | −0.8 | −13.7 |
| C2-101107 | 15000 | 10 | 9.5 | 0 | 3 | 106.8 | 98.0 | 103.1 | 80.6 | −3.7 | −17.4 |
| C3-101107 | 20000 | 10 | 9.6 | 0 | 3 | 108.4 | 100.9 | — | — | — | — |
| C4-101107 | 25000 | 10 | 9.7 | 0 | 3 | 109.1 | 100.6 | 107.3 | 87.8 | −1.8 | −12.8 |
| C5-101107 | 30000 | 10 | 9.7 | 0 | 3 | 108.7 | 99.9 | 106.5 | 94.1 | −2.2 | −5.8 |
| C6-101107 | 35000 | 10 | 9.8 | 0 | 3 | 107.8 | 97.6 | — | — | — | — |
| D1-101107 | 10000 | 10 | 9.0 | 0 | 4 | 99.7 | 89.6 | 97.7 | 82.8 | −2.0 | −6.8 |
| D2-101107 | 15000 | 10 | 9.3 | 0 | 4 | 104.5 | 98.1 | 101.3 | 88.4 | −3.2 | −9.7 |
| D3-101107 | 20000 | 10 | 9.5 | 0 | 4 | 106.3 | 99.9 | — | — | — | — |
| D4-101107 | 25000 | 10 | 9.6 | 0 | 4 | 107.1 | 99.1 | — | — | — | — |
| D5-101107 | 30000 | 10 | 9.6 | 0 | 4 | 105.6 | 101.9 | — | — | — | — |
| D6-101107 | 35000 | 10 | 9.7 | 0 | 4 | 106.1 | 101.8 | — | — | — | — |
| A1-101108 | 10000 | 20 | 19.7 | 0 | 0 | 98.2 | 72.3 | 101.1 | 70.5 | 2.9 | −1.8 |
| A2-101108 | 15000 | 20 | 19.8 | 0 | 0 | 102.9 | 76.7 | 102.3 | 73.8 | −0.6 | −2.9 |
| A3-101108 | 20000 | 20 | 19.8 | 0 | 0 | 94.8 | 69.8 | 96.6 | 68.8 | 1.8 | −1.0 |
| A4-101108 | 25000 | 20 | 19.9 | 0 | 0 | 103.5 | 77.1 | 103.5 | 73.6 | 0.0 | −3.5 |
| A5-101108 | 30000 | 20 | 19.9 | 0 | 0 | 107.2 | 83.1 | 106.5 | 78.0 | −0.7 | −5.1 |
| A6-101108 | 35000 | 20 | 19.9 | 0 | 0 | 104.1 | 82.9 | 105.7 | 81.0 | 1.6 | −1.9 |
| B1-101108 | 10000 | 20 | 18.8 | 0 | 2 | 100.4 | 80.1 | 101.2 | 93.9 | 0.8 | 13.8 |
| B2-101108 | 15000 | 20 | 19.2 | 0 | 2 | 106.2 | 84.4 | 103.9 | 97.0 | −2.3 | 12.6 |
| B3-101108 | 20000 | 20 | 19.4 | 0 | 2 | 109.3 | 86.0 | 106.0 | 95.7 | −3.3 | 9.7 |
| B4-101108 | 25000 | 20 | 19.5 | 0 | 2 | 108.4 | 84.1 | 107.9 | 100.0 | −0.5 | 15.9 |
| B5-101108 | 30000 | 20 | 19.6 | 0 | 2 | 108.4 | 79.5 | 108.8 | 101.5 | 0.4 | 22.0 |
| B6-101108 | 35000 | 20 | 19.6 | 0 | 2 | 106.9 | 94.1 | 108.7 | 96.7 | 1.8 | 2.6 |
| C1-101108 | 10000 | 20 | 18.4 | 0 | 3 | 98.4 | 68.7 | 95.8 | 82.8 | −2.6 | 14.1 |
| C2-101108 | 15000 | 20 | 18.9 | 0 | 3 | 105.2 | 86.0 | 102.9 | 94.2 | −2.3 | 8.2 |
| C3-101108 | 20000 | 20 | 19.2 | 0 | 3 | 107.5 | 83.5 | 105.8 | 98.6 | −1.7 | 15.1 |
| C4-101108 | 25000 | 20 | 19.3 | 0 | 3 | 108.6 | 83.4 | 108.0 | 99.1 | −0.6 | 15.7 |
| C5-101108 | 30000 | 20 | 19.4 | 0 | 3 | 107.9 | 84.6 | 107.9 | 98.8 | 0.0 | 14.2 |
| C6-101108 | 35000 | 20 | 19.5 | 0 | 3 | 107.7 | 84.1 | 107.6 | 93.3 | −0.1 | 9.2 |
| D1-101108 | 10000 | 20 | 18.0 | 0 | 4 | 98.1 | 71.2 | 101.3 | 79.6 | 3.2 | 8.4 |
| D2-101108 | 15000 | 20 | 18.6 | 0 | 4 | 103.3 | 84.3 | 103.1 | 92.6 | −0.2 | 8.3 |
| D3-101108 | 20000 | 20 | 19.0 | 0 | 4 | 105.3 | 83.5 | 103.0 | 83.4 | −2.3 | −0.1 |
| D4-101108 | 25000 | 20 | 19.2 | 0 | 4 | 105.9 | 83.5 | 105.5 | 91.3 | −0.4 | 7.8 |
| D5-101108 | 30000 | 20 | 19.3 | 0 | 4 | 106.5 | 84.8 | 105.3 | 97.4 | −1.2 | 12.6 |
| D6-101108 | 35000 | 20 | 19.4 | 0 | 4 | 106.8 | 85.0 | 106.4 | 93.3 | −0.4 | 8.3 |

TABLE 5-continued

| Coating ID | Target PDMS Mn (g/mole) | % Oligomer added | % actual PDMS added | EC = 0; GC = 1 | Number of Caprolactone per Hydroxyl | Initial Water Contact Angel (deg) | Initial Methylene Iodide Contact Angel (deg) | Water Contact Angle after water immersion (deg) | Methylene Iodide Contact Angel after water immersion (deg) | Change in Water Contact Angle (deg) | Change in Methylene Iodide Contact Angle (deg) |
|---|---|---|---|---|---|---|---|---|---|---|---|
| A1-101109 | 10000 | 30 | 29.5 | 0 | 0 | 103.1 | 95.1 | 103.2 | 92.0 | 0.1 | −3.1 |
| A2-101109 | 15000 | 30 | 29.7 | 0 | 0 | 107.2 | 97.4 | 104.3 | 95.7 | −2.9 | −1.7 |
| A3-101109 | 20000 | 30 | 29.7 | 0 | 0 | 109.6 | 97.4 | 108.0 | 96.9 | −1.6 | −0.5 |
| A4-101109 | 25000 | 30 | 29.8 | 0 | 0 | 108.3 | 101.7 | 106.8 | 99.9 | −1.5 | −1.8 |
| A5-101109 | 30000 | 30 | 29.8 | 0 | 0 | 109.6 | 102.1 | 108.5 | 97.5 | −1.1 | −4.6 |
| A6-101109 | 35000 | 30 | 29.8 | 0 | 0 | 109.4 | 100.8 | 107.4 | 96.0 | −2.0 | −4.8 |
| B1-101109 | 10000 | 30 | 28.2 | 0 | 2 | 102.9 | 95.8 | 101.3 | 94.0 | −1.6 | −1.8 |
| B2-101109 | 15000 | 30 | 28.8 | 0 | 2 | 107.6 | 90.8 | 102.8 | 96.2 | −4.8 | 5.4 |
| B3-101109 | 20000 | 30 | 29.1 | 0 | 2 | 108.8 | 87.2 | 104.6 | 98.6 | −4.2 | 11.4 |
| B4-101109 | 25000 | 30 | 29.3 | 0 | 2 | 109.1 | 99.5 | 104.1 | 99.1 | −5.0 | −0.4 |
| B5-101109 | 30000 | 30 | 29.4 | 0 | 2 | 109.4 | 101.0 | 106.7 | 100.2 | −2.7 | −0.8 |
| B6-101109 | 35000 | 30 | 29.5 | 0 | 2 | 107.9 | 98.6 | 105.6 | 95.1 | −2.3 | −3.5 |
| C1-101109 | 10000 | 30 | 27.6 | 0 | 3 | 101.6 | 91.1 | 99.1 | 81.6 | −2.5 | −9.5 |
| C2-101109 | 15000 | 30 | 28.4 | 0 | 3 | 105.7 | 89.6 | 102.9 | 95.1 | −2.8 | 5.5 |
| C3-101109 | 20000 | 30 | 28.8 | 0 | 3 | 107.2 | 84.4 | 102.3 | 97.4 | −4.9 | 13.0 |
| C4-101109 | 25000 | 30 | 29.0 | 0 | 3 | 109.7 | 99.4 | 105.0 | 98.8 | −4.7 | −0.6 |
| C5-101109 | 30000 | 30 | 29.2 | 0 | 3 | 109.0 | 100.6 | 106.7 | 99.6 | −2.3 | −1.0 |
| C6-101109 | 35000 | 30 | 29.3 | 0 | 3 | 107.7 | 99.7 | 104.8 | 95.9 | −2.9 | −3.8 |
| D1-101109 | 10000 | 30 | 27.1 | 0 | 4 | 98.8 | 89.5 | 100.7 | 88.5 | 1.9 | −1.0 |
| D2-101109 | 15000 | 30 | 28.0 | 0 | 4 | 105.9 | 94.3 | 103.0 | 93.5 | −2.9 | −0.8 |
| D3-101109 | 20000 | 30 | 28.5 | 0 | 4 | 110.1 | 98.1 | 105.3 | 93.9 | −4.8 | −4.2 |
| D4-101109 | 25000 | 30 | 28.7 | 0 | 4 | 107.4 | 101.6 | 104.6 | 97.1 | −2.8 | −4.5 |
| D5-101109 | 30000 | 30 | 28.9 | 0 | 4 | 106.0 | 98.5 | 103.5 | 95.0 | −2.5 | −3.5 |
| D6-101109 | 35000 | 30 | 29.1 | 0 | 4 | 106.8 | 100.4 | 108.6 | 93.7 | 1.8 | −6.7 |
| A1-101110 | 10000 | 40 | 39.3 | 0 | 0 | 101.1 | 72.5 | 110.2 | 85.2 | 9.1 | 12.7 |
| A2-101110 | 15000 | 40 | 39.5 | 0 | 0 | 101.3 | 75.4 | 106.0 | 78.4 | 4.7 | 3.0 |
| A3-101110 | 20000 | 40 | 39.7 | 0 | 0 | 94.3 | 71.4 | 98.8 | 73.9 | 4.5 | 2.5 |
| A4-101110 | 25000 | 40 | 39.7 | 0 | 0 | 108.4 | 83.2 | 109.7 | 81.8 | 1.3 | −1.4 |
| A5-101110 | 30000 | 40 | 39.8 | 0 | 0 | 109.9 | 84.8 | 114.7 | 85.2 | 4.8 | 0.4 |
| A6-101110 | 35000 | 40 | 39.8 | 0 | 0 | 111.8 | 88.1 | 112.7 | 88.6 | 0.9 | 0.5 |
| B1-101110 | 10000 | 40 | 37.6 | 0 | 2 | 106.7 | 100.8 | 107.4 | 93.0 | 0.7 | −7.8 |
| B2-101110 | 15000 | 40 | 38.4 | 0 | 2 | 109.4 | 98.0 | 108.0 | 99.4 | −1.4 | 1.4 |
| B3-101110 | 20000 | 40 | 38.8 | 0 | 2 | 110.1 | 103.2 | 107.6 | 99.0 | −2.5 | −4.2 |
| B4-101110 | 25000 | 40 | 39.0 | 0 | 2 | 111.0 | 103.2 | 108.4 | 98.7 | −2.6 | −4.5 |
| B5-101110 | 30000 | 40 | 39.2 | 0 | 2 | 111.0 | 100.9 | 109.3 | 99.5 | −1.7 | −1.4 |
| B6-101110 | 35000 | 40 | 39.3 | 0 | 2 | 110.8 | 101.7 | 110.3 | 100.7 | −0.5 | −1.0 |

TABLE 5-continued

| Coating ID | Target PDMS Mn (g/mole) | % Oligomer added | % actual PDMS added | EC = 0; GC = 1 | Number of Caprolactone per Hydroxyl | Initial Water Contact Angel (deg) | Initial Methylene Iodide Contact Angel (deg) | Water Contact Angle after water immersion (deg) | Methylene Iodide Contact Angel after water immersion (deg) | Change in Water Contact Angle (deg) | Change in Methylene Iodide Contact Angle (deg) |
|---|---|---|---|---|---|---|---|---|---|---|---|
| C1-101110 | 10000 | 40 | 36.8 | 0 | 3 | 104.8 | 98.8 | 105.0 | 94.9 | 0.2 | −3.9 |
| C2-101110 | 15000 | 40 | 37.8 | 0 | 3 | 108.5 | 100.1 | 108.0 | 96.4 | −0.5 | −3.7 |
| C3-101110 | 20000 | 40 | 38.3 | 0 | 3 | 109.9 | 101.8 | 108.7 | 97.8 | −1.2 | −4.0 |
| C4-101110 | 25000 | 40 | 38.7 | 0 | 3 | 110.7 | 100.4 | 109.1 | 99.3 | −1.6 | −1.1 |
| C5-101110 | 30000 | 40 | 38.9 | 0 | 3 | 110.2 | 101.9 | 110.3 | 98.1 | 0.1 | −3.8 |
| C6-101110 | 35000 | 40 | 39.0 | 0 | 3 | 109.7 | 100.4 | 110.3 | 100.6 | 0.6 | 0.2 |
| D1-101110 | 10000 | 40 | 36.1 | 0 | 4 | 103.6 | 93.3 | 105.5 | 91.7 | 1.9 | −1.6 |
| D2-101110 | 15000 | 40 | 37.3 | 0 | 4 | 107.9 | 99.7 | 108.8 | 95.3 | 0.9 | −4.4 |
| D3-101110 | 20000 | 40 | 37.9 | 0 | 4 | 109.1 | 103.9 | 108.5 | 96.1 | −0.6 | −7.8 |
| D4-101110 | 25000 | 40 | 38.3 | 0 | 4 | 109.1 | 103.3 | 105.7 | 75.0 | −3.4 | −28.3 |
| D5-101110 | 30000 | 40 | 38.6 | 0 | 4 | 109.1 | 102.2 | 107.8 | 80.5 | −1.3 | −21.7 |
| D6-101110 | 35000 | 40 | 38.8 | 0 | 4 | 109.0 | 101.4 | 109.1 | 92.1 | 0.1 | −9.3 |
| A1-101119 | 10000 | 10 | 9.8 | 1 | 0 | 102.9 | 98.3 | 98.7 | 94.7 | −4.2 | −3.6 |
| A2-101119 | 15000 | 10 | 9.9 | 1 | 0 | 106.7 | 96.3 | 103.9 | 95.2 | −2.8 | −1.1 |
| A3-101119 | 20000 | 10 | 9.9 | 1 | 0 | 110.1 | 98.3 | 105.6 | 86.3 | −4.5 | −12.0 |
| A4-101119 | 25000 | 10 | 9.9 | 1 | 0 | 110.8 | 100.4 | 107.2 | 95.0 | −3.6 | −5.4 |
| A5-101119 | 30000 | 10 | 9.9 | 1 | 0 | 112.1 | 101.6 | 110.8 | 98.6 | −1.3 | −3.0 |
| A6-101119 | 35000 | 10 | 9.9 | 1 | 0 | 111.1 | 101.3 | 110.2 | 101.5 | −0.9 | 0.2 |
| B1-101119 | 10000 | 10 | 9.4 | 1 | 2 | 101.1 | 90.9 | 95.6 | 87.6 | −5.5 | −3.3 |
| B2-101119 | 15000 | 10 | 9.6 | 1 | 2 | 105.5 | 97.2 | 100.6 | 86.7 | −4.9 | −10.5 |
| B3-101119 | 20000 | 10 | 9.7 | 1 | 2 | 106.7 | 96.0 | 102.1 | 77.2 | −4.6 | −18.8 |
| B4-101119 | 25000 | 10 | 9.8 | 1 | 2 | 108.0 | 90.6 | 105.4 | 97.8 | −2.6 | 7.2 |
| B5-101119 | 30000 | 10 | 9.8 | 1 | 2 | 107.9 | 102.1 | 103.6 | 95.7 | −4.3 | −6.4 |
| B6-101119 | 35000 | 10 | 9.8 | 1 | 2 | 107.1 | 99.8 | 106.6 | 81.8 | −0.5 | −18.0 |
| C1-101119 | 10000 | 10 | 9.2 | 1 | 3 | 99.5 | 88.3 | 95.3 | 84.6 | −4.2 | −3.7 |
| C2-101119 | 15000 | 10 | 9.5 | 1 | 3 | 104.4 | 97.1 | 100.4 | 90.4 | −4.0 | −6.7 |
| C3-101119 | 20000 | 10 | 9.6 | 1 | 3 | 106.6 | 86.6 | 99.8 | 89.4 | −6.8 | 2.8 |
| C4-101119 | 25000 | 10 | 9.7 | 1 | 3 | 106.9 | 90.3 | 103.5 | 91.0 | −3.4 | 0.7 |
| C5-101119 | 30000 | 10 | 9.7 | 1 | 3 | 107.2 | 90.5 | 104.3 | 95.7 | −2.9 | 5.2 |
| C6-101119 | 35000 | 10 | 9.8 | 1 | 3 | 106.1 | 92.9 | 103.6 | 87.4 | −2.5 | −5.5 |
| D1-101119 | 10000 | 10 | 9.0 | 1 | 4 | 99.3 | 94.5 | 94.6 | 82.5 | −4.7 | −12.0 |
| D2-101119 | 15000 | 10 | 9.3 | 1 | 4 | 102.3 | 95.2 | 97.6 | 88.9 | −4.7 | −6.3 |
| D3-101119 | 20000 | 10 | 9.5 | 1 | 4 | 104.3 | 97.3 | 100.7 | 86.1 | −3.6 | −11.2 |
| D4-101119 | 25000 | 10 | 9.6 | 1 | 4 | 105.0 | 87.9 | 99.6 | 93.7 | −5.4 | 5.8 |
| D5-101119 | 30000 | 10 | 9.6 | 1 | 4 | 105.7 | 87.9 | 101.0 | 77.9 | −4.7 | −10.0 |
| D6-101119 | 35000 | 10 | 9.7 | 1 | 4 | 106.0 | 98.5 | 105.0 | 71.6 | −1.0 | −26.9 |

TABLE 5-continued

| Coating ID | Target PDMS Mn (g/mole) | % Oligomer added | % actual PDMS added | EC = 0; GC = 1 | Number of Caprolactone per Hydroxyl | Initial Water Contact Angel (deg) | Initial Methylene Iodide Contact Angel (deg) | Water Contact Angle after water immersion (deg) | Methylene Iodide Contact Angel after water immersion (deg) | Change in Water Contact Angle (deg) | Change in Methylene Iodide Contact Angle (deg) |
|---|---|---|---|---|---|---|---|---|---|---|---|
| A1-101120 | 10000 | 20 | 19.7 | 1 | 0 | 104.1 | 95.9 | 103.0 | 95.2 | −1.1 | −0.7 |
| A2-101120 | 15000 | 20 | 19.8 | 1 | 0 | 105.6 | 97.4 | 104.4 | 81.4 | −1.2 | −16.0 |
| A3-101120 | 20000 | 20 | 19.8 | 1 | 0 | 107.4 | 88.1 | 106.4 | 81.0 | −1.0 | −7.1 |
| A4-101120 | 25000 | 20 | 19.9 | 1 | 0 | 107.1 | 89.1 | 108.4 | 80.7 | 1.3 | −8.4 |
| A5-101120 | 30000 | 20 | 19.9 | 1 | 0 | 108.6 | 87.4 | 108.5 | 83.5 | −0.1 | −3.9 |
| A6-101120 | 35000 | 20 | 19.9 | 1 | 0 | 108.4 | 100.2 | 108.4 | 83.5 | 0.0 | −16.7 |
| B1-101120 | 10000 | 20 | 18.8 | 1 | 2 | 100.5 | 94.4 | 98.6 | 87.9 | −1.9 | −6.5 |
| B2-101120 | 15000 | 20 | 19.2 | 1 | 2 | 103.7 | 96.4 | 102.8 | 79.1 | −0.9 | −17.3 |
| B3-101120 | 20000 | 20 | 19.4 | 1 | 2 | 104.5 | 88.6 | 104.0 | 79.5 | −0.5 | −9.1 |
| B4-101120 | 25000 | 20 | 19.5 | 1 | 2 | 106.6 | 100.6 | 107.0 | 81.6 | 0.4 | −19.0 |
| B5-101120 | 30000 | 20 | 19.6 | 1 | 2 | 106.4 | 85.4 | 105.6 | 82.6 | −0.8 | −2.8 |
| B6-101120 | 35000 | 20 | 19.6 | 1 | 2 | 106.6 | 95.6 | 107.7 | 81.0 | 1.1 | −14.6 |
| C1-101120 | 10000 | 20 | 18.4 | 1 | 3 | 99.0 | 89.6 | 97.4 | 72.4 | −1.6 | −17.2 |
| C2-101120 | 15000 | 20 | 18.9 | 1 | 3 | 101.9 | 95.2 | 101.4 | 76.8 | −0.5 | −18.4 |
| C3-101120 | 20000 | 20 | 19.2 | 1 | 3 | 104.7 | 88.3 | 104.2 | 81.4 | −0.5 | −6.9 |
| C4-101120 | 25000 | 20 | 19.3 | 1 | 3 | 105.8 | 86.3 | 104.0 | 81.6 | −1.8 | −4.7 |
| C5-101120 | 30000 | 20 | 19.4 | 1 | 3 | 106.4 | 87.2 | 105.4 | 80.6 | −1.0 | −6.6 |
| C6-101120 | 35000 | 20 | 19.5 | 1 | 3 | 106.7 | 93.7 | 106.3 | 80.7 | −0.4 | −13.0 |
| D1-101120 | 10000 | 20 | 18.0 | 1 | 4 | 99.0 | 88.8 | 96.0 | 69.8 | −3.0 | −19.0 |
| D2-101120 | 15000 | 20 | 18.6 | 1 | 4 | 98.8 | 86.6 | 98.4 | 72.3 | −0.4 | −14.3 |
| D3-101120 | 20000 | 20 | 19.0 | 1 | 4 | 101.4 | 75.9 | 101.4 | 75.2 | 0.0 | −0.7 |
| D4-101120 | 25000 | 20 | 19.2 | 1 | 4 | 103.8 | 88.5 | 101.6 | 78.4 | −2.2 | −10.1 |
| D5-101120 | 30000 | 20 | 19.3 | 1 | 4 | 105.0 | 88.3 | 103.6 | 83.8 | −1.4 | −4.5 |
| D6-101120 | 35000 | 20 | 19.4 | 1 | 4 | 105.3 | 99.2 | 104.6 | 89.2 | −0.7 | −10.0 |
| A1-101121 | 10000 | 30 | 29.5 | 1 | 0 | 100.6 | 95.4 | 102.6 | 96.5 | 2.0 | 1.1 |
| A2-101121 | 15000 | 30 | 29.7 | 1 | 0 | 108.3 | 90.9 | 106.2 | 99.4 | −2.1 | 8.5 |
| A3-101121 | 20000 | 30 | 29.7 | 1 | 0 | 110.2 | 87.6 | 107.8 | 93.3 | −2.4 | 5.7 |
| A4-101121 | 25000 | 30 | 29.8 | 1 | 0 | 108.0 | 86.0 | 109.1 | 99.5 | 1.1 | 13.5 |
| A5-101121 | 30000 | 30 | 29.8 | 1 | 0 | 111.2 | 101.8 | 110.9 | 101.0 | −0.3 | −0.8 |
| A6-101121 | 35000 | 30 | 29.8 | 1 | 0 | 111.3 | 102.8 | 114.0 | 100.5 | 2.7 | −2.3 |
| B1-101121 | 10000 | 30 | 28.2 | 1 | 2 | 96.7 | 90.2 | 100.1 | 91.8 | 3.4 | 1.6 |
| B2-101121 | 15000 | 30 | 28.8 | 1 | 2 | 104.8 | 97.9 | 104.0 | 97.4 | −0.8 | −0.5 |
| B3-101121 | 20000 | 30 | 29.1 | 1 | 2 | 107.0 | 82.1 | 105.2 | 94.8 | −1.8 | 12.7 |
| B4-101121 | 25000 | 30 | 29.3 | 1 | 2 | 107.6 | 86.7 | 106.7 | 99.4 | −0.9 | 12.7 |
| B5-101121 | 30000 | 30 | 29.4 | 1 | 2 | 108.0 | 100.0 | 109.9 | 94.5 | 1.9 | −5.5 |
| B6-101121 | 35000 | 30 | 29.5 | 1 | 2 | 107.7 | 100.1 | 111.1 | 98.1 | 3.4 | −2.0 |

TABLE 5-continued

| Coating ID | Target PDMS Mn (g/mole) | % Oligomer added | % actual PDMS added | EC = 0; GC = 1 | Number of Caprolactone per Hydroxyl | Initial Water Contact Angel (deg) | Initial Methylene Iodide Contact Angel (deg) | Water Contact Angle after water immersion (deg) | Methylene Iodide Contact Angel after water immersion (deg) | Change in Water Contact Angle (deg) | Change in Methylene Iodide Contact Angle (deg) |
|---|---|---|---|---|---|---|---|---|---|---|---|
| C1-101121 | 10000 | 30 | 27.6 | 1 | 3 | 96.0 | 89.6 | 96.6 | 89.1 | 0.6 | −0.5 |
| C2-101121 | 15000 | 30 | 28.4 | 1 | 3 | 105.3 | 98.1 | 100.1 | 96.3 | −5.2 | −1.8 |
| C3-101121 | 20000 | 30 | 28.8 | 1 | 3 | 107.2 | 86.2 | 104.6 | 96.7 | −2.6 | 10.5 |
| C4-101121 | 25000 | 30 | 29.0 | 1 | 3 | 107.4 | 88.5 | 107.8 | 98.0 | 0.4 | 9.5 |
| C5-101121 | 30000 | 30 | 29.2 | 1 | 3 | 107.5 | 100.3 | 109.2 | 95.8 | 1.7 | −4.5 |
| C6-101121 | 35000 | 30 | 29.3 | 1 | 3 | 107.5 | 99.3 | 110.2 | 97.3 | 2.7 | −2.0 |
| D1-101121 | 10000 | 30 | 27.1 | 1 | 4 | 95.3 | 87.2 | 98.3 | 88.6 | 3.0 | 1.4 |
| D2-101121 | 15000 | 30 | 28.0 | 1 | 4 | 100.7 | 87.5 | 101.1 | 89.1 | 0.4 | 1.6 |
| D3-101121 | 20000 | 30 | 28.5 | 1 | 4 | 102.9 | 83.9 | 101.9 | 96.9 | −1.0 | 13.0 |
| D4-101121 | 25000 | 30 | 28.7 | 1 | 4 | 105.4 | 97.5 | 105.9 | 96.6 | 0.5 | −0.9 |
| D5-101121 | 30000 | 30 | 28.9 | 1 | 4 | 104.3 | 99.8 | 108.3 | 99.1 | 4.0 | −0.7 |
| D6-101121 | 35000 | 30 | 29.1 | 1 | 4 | 106.2 | 97.4 | 109.2 | 96.7 | 3.0 | −0.7 |
| A1-101122 | 10000 | 40 | 39.3 | 1 | 0 | 103.5 | 98.9 | 102.4 | 98.1 | −1.1 | −0.8 |
| A2-101122 | 15000 | 40 | 39.5 | 1 | 0 | 104.9 | 87.8 | 106.2 | 97.5 | 1.3 | 9.7 |
| A3-101122 | 20000 | 40 | 39.7 | 1 | 0 | 107.2 | 98.7 | 106.9 | 98.1 | −0.3 | −0.6 |
| A4-101122 | 25000 | 40 | 39.7 | 1 | 0 | 107.9 | 99.0 | 108.9 | 98.0 | 1.0 | −1.0 |
| A5-101122 | 30000 | 40 | 39.8 | 1 | 0 | 112.2 | 99.4 | 112.6 | 102.3 | 0.4 | 2.9 |
| A6-101122 | 35000 | 40 | 39.8 | 1 | 0 | 108.4 | 102.0 | 111.4 | 96.6 | 3.0 | −5.4 |
| B1-101122 | 10000 | 40 | 37.6 | 1 | 2 | 103.8 | 84.9 | 102.9 | 98.5 | −0.9 | 13.6 |
| B2-101122 | 15000 | 40 | 38.4 | 1 | 2 | 105.4 | 96.6 | 107.0 | 98.6 | 1.6 | 2.0 |
| B3-101122 | 20000 | 40 | 38.8 | 1 | 2 | 106.6 | 98.4 | 107.1 | 97.7 | 0.5 | −0.7 |
| B4-101122 | 25000 | 40 | 39.0 | 1 | 2 | 108.1 | 100.4 | 106.9 | 98.0 | −1.2 | −2.4 |
| B5-101122 | 30000 | 40 | 39.2 | 1 | 2 | 107.4 | 99.6 | 107.1 | 99.2 | −0.3 | −0.4 |
| B6-101122 | 35000 | 40 | 39.3 | 1 | 2 | 107.4 | 101.8 | 106.8 | 103.5 | −0.6 | 1.7 |
| C1-101122 | 10000 | 40 | 36.8 | 1 | 3 | 98.7 | 75.9 | 97.5 | 89.7 | −1.2 | 13.8 |
| C2-101122 | 15000 | 40 | 37.8 | 1 | 3 | 104.9 | 98.5 | 106.2 | 99.3 | 1.3 | 0.8 |
| C3-101122 | 20000 | 40 | 38.3 | 1 | 3 | 106.7 | 100.0 | 107.5 | 99.1 | 0.8 | −0.9 |
| C4-101122 | 25000 | 40 | 38.7 | 1 | 3 | 107.4 | 98.9 | 106.1 | 100.1 | −1.3 | 1.2 |
| C5-101122 | 30000 | 40 | 38.9 | 1 | 3 | 107.1 | 99.8 | 107.6 | 100.0 | 0.5 | 0.2 |
| C6-101122 | 35000 | 40 | 39.0 | 1 | 3 | 106.7 | 100.1 | 106.0 | 92.9 | −0.7 | −7.2 |
| D1-101122 | 10000 | 40 | 36.1 | 1 | 4 | 101.5 | 88.3 | 99.5 | 89.0 | −2.0 | 0.7 |
| D2-101122 | 15000 | 40 | 37.3 | 1 | 4 | 101.5 | 92.6 | 101.1 | 95.7 | −0.4 | 3.1 |
| D3-101122 | 20000 | 40 | 37.9 | 1 | 4 | 104.0 | 100.9 | 102.7 | 97.8 | −1.3 | −3.1 |

TABLE 5-continued

| Coating ID | Target PDMS Mn (g/mole) | % Oligomer added | % actual PDMS added | EC = 0; GC = 1 | Number of Caprolactone per Hydroxyl | Initial Water Contact Angel (deg) | Initial Methylene Iodide Contact Angel (deg) | Water Contact Angle after water immersion (deg) | Methylene Iodide Contact Angel after water immersion (deg) | Change in Water Contact Angle (deg) | Change in Methylene Iodide Contact Angle (deg) |
|---|---|---|---|---|---|---|---|---|---|---|---|
| D4-101122 | 25000 | 40 | 38.3 | 1 | 4 | 104.3 | 99.6 | 103.2 | 95.2 | −1.1 | −4.4 |
| D5-101122 | 30000 | 40 | 38.6 | 1 | 4 | 104.9 | 97.5 | 100.9 | 98.0 | −4.0 | 0.5 |
| D6-101122 | 35000 | 40 | 38.8 | 1 | 4 | 104.7 | 100.2 | 106.1 | 98.8 | 1.4 | −1.4 |

What is claimed is:

1. A polymer having the formula:

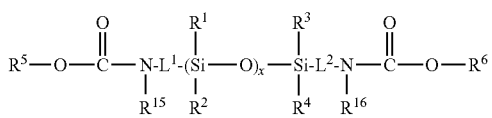

wherein x is such that the polymer has a molecular weight of about 1,000 to 100,000;

$R^1$, $R^2$, $R^3$, and $R^4$ are independently hydrogen, $C_1$-$C_{10}$ alkyl, $C_1$-$C_{10}$ fluoro-substituted alkyl, cyclopentyl, cyclohexyl, benzyl, toluoyl, xylylor phenyl;

$R^5$ is represented by a formula

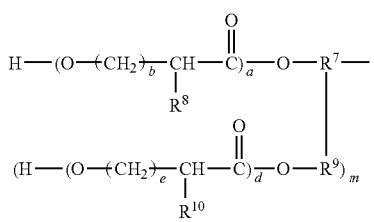

and $R^6$ is represented by a formula;

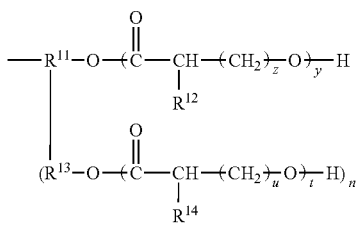

wherein $R^7$, $R^9$, $R^{11}$, and $R^{13}$ are independently linear or branched alkylene;

$R^8$, $R^{10}$, $R^{12}$, and $R^{14}$ are independently hydrogen or linear or branched $C_1$-$C_{10}$ alkyl;

b, e, z, and u are independently an integer from 0 to 6;

a, d, y, and t are independently an integer from 1 to 300; and m and n are independently 0 or 1;

$R^{15}$ and $R^{16}$ are independently hydrogen, $C_1$-$C_{10}$ alkyl, cyclopentyl, cyclohexyl, benzyl, toluoyl, xylyl or phenyl; and $L^1$ and $L^2$ are linking groups.

2. The polymer of claim 1 wherein $R^1$, $R^2$, $R^3$, and $R^4$ are independently $C_1$-$C_{10}$ alkyl.

3. The polymer of claim 1 wherein $L^1$ and $L^2$ are independently linear or branched alkylene having from 2 to 10 carbon atoms.

4. The polymer of claim 1 wherein $R^1$, $R^2$, $R^3$, and $R^4$ are methyl; and $R^{15}$ and $R^{16}$ are hydrogen.

5. A polyurethane polymer prepared by reacting a mixture comprising the polymer of claim 1 and an isocyanate functional compound.

6. The polyurethane polymer of claim 5 wherein the mixture further comprises a polyol compound.

7. A coating comprising the polyurethane polymer of claim 6.

8. A polymer comprising at least one polyester subunit and at least one subunit derived from a polysiloxane terminated with a hydroxy functional carbamate group.

9. The polymer of claim 8 wherein the at least one subunit is derived from a polysiloxane terminated with a hydroxy alkyl functional carbamate group.

10. The polymer of claim 8 wherein the polymer is derived by crosslinking the polysiloxane using an isocyanate functional compound.

11. The polymer of claim 8 wherein the polymer is derived by reacting the polysiloxane with a mixture comprising an isocyanate functional compound and a polyol compound, which includes polyester polyol, polyether polyol, polycarbonate polyol, acrylic polyol or a mixture thereof.

12. A coating comprising the polymer of claim 8.

13. The coating of claim 12 having a water contact angle after immersion in water for 30 days of at least about 90°.

14. An article having at least one surface comprising the polymeric coating of claim 12.

15. A coating composition comprising a solvent component; and the polymer of claim 1.

16. The polymer of claim 1 wherein $R^1$, $R^2$, $R^3$, and $R^4$ are methyl;

$L^1$ and $L^2$ are independently linear or branched alkylene having from 2 to 10 carbon atoms;

$R^8$, $R^{10}$, $R^{12}$, and $R^{14}$ are hydrogen;

$R^{15}$ and $R^{16}$ are hydrogen;

b, e, z and u are independently an integer from 2 to 6;

a, d, y and t are independently an integer from 1 to 10; and the polymer has a number average molecular weight of about 5,000 to 50,000.

17. A polymeric coating comprising a polyurethane polymer prepared by reacting a mixture comprising polyol compound; polyisocyanate; and hydroxy terminated polysiloxane having a formula:

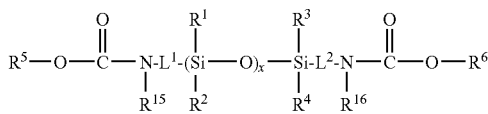

wherein x is such that the hydroxy terminated polysiloxane has a number average molecular weight of about 5,000 to 50,000;

$R^1$, $R^2$, $R^3$, and $R^4$ are independently hydrogen, $C_1$-$C_{10}$ alkyl, $C_1$-$C_{10}$ fluoro-substituted alkyl, cyclopentyl, cyclohexyl, benzyl, toluoyl, xylyl or phenyl;

$R^5$ and $R^6$ are independently a hydroxy-substituted terminal group;

$R^{15}$ and $R^{16}$ are independently hydrogen, $C_1$-$C_{10}$ alkyl, cyclopentyl, cyclohexyl, benzyl, toluoyl, xylyl or phenyl;

$L^1$ and $L^2$ are linking groups;

the polyisocyanate having an isocyanate equivalent weight of about 150 to 600 and including polyisocyanate having at least three isocyanate groups; and the polymeric coating has a water contact angle after immersion in water for 30 days of at least about 100°.

18. The polymeric coating of claim 17 wherein $R^1$, $R^2$, $R^3$, and $R^4$ are methyl;

$L^1$ and $L^2$ are independently linear or branched alkylene having from 2 to 10 carbon atoms;

$R^{15}$ and $R^{16}$ are hydrogen;

b, e, z and u are independently an integer from 2 to 6; and a, d, y and t are independently an integer from 1 to 10.

19. The polymeric coating of claim 18 wherein the polyisocyanate comprises isophorone diisocyanate-based polyisocyanate having an isocyanate equivalent weight of about 200 to 500; hexane diisocyanate-based polyisocyanate having an isocyanate equivalent weight of about 150 to 300; or a mixture thereof.

20. A polymeric coating prepared by reacting a mixture comprising an isocyanate functional compound; polyol compound; and a polysiloxane polymer having a formula:

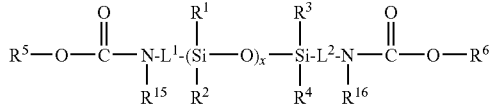

wherein x is such that the polysiloxane polymer has a number average molecular weight of about 5,000 to 75,000;

$R^1$, $R^2$, $R^3$, and $R^4$ are independently hydrogen, $C_1$-$C_{10}$ alkyl, $C_1$-$C_{10}$ fluoro-substituted alkyl, cyclopentyl, cyclohexyl, benzyl, toluoyl, xylyl or phenyl;

$R^5$ and $R^6$ are independently a hydroxy-substituted terminal group;

$R^{15}$ and $R^{16}$ are independently hydrogen, $C_1$-$C_{10}$ alkyl, cyclopentyl, cyclohexyl, benzyl, toluoyl, xylyl or phenyl;

$L^1$ and $L^2$ are linking groups;

the isocyanate functional compound comprises polyisocyanate having at least three isocyanate groups; and the polymeric coating has a water contact angle after immersion in water for 30 days of at least about 100°.

21. The polymeric coating of claim 20 wherein $R^1$, $R^2$, $R^3$, and $R^4$ are methyl;

$L^1$ and $L^2$ are independently linear or branched alkylene having from 2 to 10 carbon atoms;

$R^5$ and $R^6$ are independently linear or branched hydroxy-substituted alkylene;

$R^{15}$ and $R^{16}$ are hydrogen; and the polyisocyanate comprises isophorone diisocyanate-based polyisocyanate, hexane diisocyanate-based polyisocyanate, or a combination thereof.

22. The polymeric coating of claim 21 wherein the polyol compound comprises polycaprolactone polyol; and $R^5$ and $R^6$ are independently 2-hydroxyethyl and 1-(hydroxymethyl)-2-hydroxyethyl or a combination thereof.

23. The polymeric coating of claim 21 wherein the polysiloxane polymer has a number average molecular weight of about 5,000 to 50,000.

* * * * *